(12) United States Patent
Caram et al.

(10) Patent No.: US 12,031,075 B2
(45) Date of Patent: Jul. 9, 2024

(54) SYSTEMS AND METHODS FOR QUANTUM DOT ON NANOPLATELET HETEROSTRUCTURES WITH TUNABLE EMISSION IN THE SHORTWAVE INFRARED

(71) Applicant: The Regents of the University of California, Oakland, CA (US)

(72) Inventors: Justin Caram, Los Angeles, CA (US); Stephanie Tenney, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 57 days.

(21) Appl. No.: 17/465,444

(22) Filed: Sep. 2, 2021

(65) Prior Publication Data

US 2022/0064531 A1  Mar. 3, 2022

Related U.S. Application Data

(60) Provisional application No. 63/073,762, filed on Sep. 2, 2020.

(51) Int. Cl.
  *C09K 11/89* (2006.01)
  *B82Y 20/00* (2011.01)
  (Continued)

(52) U.S. Cl.
  CPC ............ *C09K 11/892* (2013.01); *C01G 11/00* (2013.01); *C01G 13/00* (2013.01); *C09K 11/883* (2013.01);
  (Continued)

(58) Field of Classification Search
  CPC ..... C09K 11/892; C09K 11/883; C01G 11/00; C01G 13/00; C01P 2004/24; C01P 2004/64
  See application file for complete search history.

(56) References Cited

U.S. PATENT DOCUMENTS

| | | | |
|---|---|---|---|
| 2015/0102271 A1 | 4/2015 | Dubertret et al. | |
| 2018/0106813 A1* | 4/2018 | Heuclin | G01N 33/588 |
| 2018/0107065 A1* | 4/2018 | Heuclin | C09K 11/565 |

FOREIGN PATENT DOCUMENTS

| | | | |
|---|---|---|---|
| CN | 109782486 | * | 5/2019 |
| WO | 2012056121 A1 | | 5/2012 |

OTHER PUBLICATIONS

Abdelazim et al., "Room Temperature Synthesis of HgTe Quantum Dots in an Aprotic Solvent Realizing High Photoluminescence Quantum Yields in the Infrared", Chemistry of Materials, Aug. 30, 2017, vol. 29, No. 18, pp. 7859-7867, doi: 10.1021/acs.chemmater.7b02637.

(Continued)

*Primary Examiner* — C Melissa Koslow

(57) ABSTRACT

Many embodiments implement quantum confined nanoplatelets (NPLs) that can be induced to emit bright and tunable infrared emission from attached quantum dot (QD). Some embodiments provide mesoscale NPLs with a largest dimension of greater than 1 micron. Certain embodiments provide methods for growing mesoscale NPLs and QD on mesoscale NPLs heterostructures. Several embodiments provide near unity energy transfer from NPLs to QDs, which can quench NPL emission and emit with high quantum yield through the shortwave infrared. The QD defect emission can be kinetically tunable, enabling controlled mid-gap emission from NPLs.

17 Claims, 30 Drawing Sheets

(51) Int. Cl.
  *B82Y 30/00*   (2011.01)
  *B82Y 40/00*   (2011.01)
  *C01G 11/00*   (2006.01)
  *C01G 13/00*   (2006.01)
  *C09K 11/88*   (2006.01)

(52) U.S. Cl.
  CPC .............. *B82Y 20/00* (2013.01); *B82Y 30/00* (2013.01); *B82Y 40/00* (2013.01); *C01P 2004/24* (2013.01); *C01P 2004/64* (2013.01); *C01P 2006/60* (2013.01)

(56) References Cited

OTHER PUBLICATIONS

Antonovich et al., "Colloidal Synthesis and Optical Properties of Type-II CdSe—CdTe and Inverted CdTe—CdSe Core-Wing Heteronanoplatelets", Nanoscale, vol. 7, No. 17, May 7, 2015, pp. 8084-8092, doi: 10.1039/c4nr07134d.

Atallah et al., "Decay-Associated Fourier Spectroscopy: Visible to Shortwave Infrared Time-Resolved Photoluminescence Spectra", Journal of Physical Chemistry A, vol. 123, No. 31, Jul. 9, 2019, pp. 6792-6798, https://doi.org/10.1021/acs.jpca.9b04924.

Bertrand et al., "Shape control of zincblende CdSe nanoplatelets", Chemical Communications, vol. 52, No. 80, 2016, pp. 11975-11978.

Dede et al., "Highly Stable Multicrown Heterostructures of Type-II Nanoplatelets for Ultralow Threshold Optical Gain", Chemistry of Materials, vol. 31, No. 5, Feb. 11, 2019, pp. 1818-1826, https://doi.org/10.1021/acs.chemmater.9b00136.

Diroll et al., "Semiconductor Nanoplatelet Excimers", Nano Letters, vol. 18, No. 11, Sep. 24, 2018, pp. 6948-6953. DOI: 10.1021/acs.nanolett.8b02865.

Franke et al., "Continuous injection synthesis of indium arsenide quantum dots emissive in the short-wavelength infrared", Nature Communications, vol. 7, No. 12749, Nov. 11, 2016, 9 pgs., https://doi.org/10.1038/ncomms12749.

Geiregat et al., "Continuous-wave infrared optical gain and amplified spontaneous emission at ultralow threshold by colloidal HgTe quantum dots", Nature Materials, vol. 17, No. 1, Jan. 1, 2018, first published Oct. 9, 2017, pp. 35-42, https://doi.org/10.1038/nmat5000.

Gupta et al., "CdxHg(1-x)Te Alloy Colloidal Quantum Dots: Tuning Optical Properties from the Visible to Near-Infrared by Ion Exchange", Particle & Particle Systems Characterization, vol. 30, Issue 4, Apr. 2013, first published Feb. 18, 2013, pp. 346-354, https://doi.org/10.1002/ppsc.201200139.

Kahn et al., "Few-Atom-Thick Colloidal PbS/CdS Core/Shell Nanosheets", Chemistry of Materials, vol. 28, No. 15, Jun. 19, 2016, pp. 5342-5346, https://doi.org/10.1021/acs.chemmater.6b01232.

Khan et al., "CdSe/CdS/CdTe Core/Barrier/Crown Nanoplatelets: Synthesis, Optoelectronic Properties, and Multiphoton Fluorescence Upconversion", ACS Nano, vol. 14, No. 4, Apr. 10, 2020, pp. 4206-4215, https://doi.org/10.1021/acsnano.9b09147.

Khan et al., "Near-Infrared Emitting Colloidal PbS Nanoplatelets: Lateral Size Control and Optical Spectroscopy", Chemistry of Materials, vol. 29, No. 7, Mar. 6, 2017, pp. 2883-2889, https://doi.org/10.1021/acs.chemmater.6b0511.

Kovalenko et al., "Colloidal HgTe Nanocrystals with Widely Tunable Narrow Band Gap Energies: From Telecommunications to Molecular Vibrations", Journal of the American Chemical Society, vol. 128, No. 11, Feb. 22, 2006, pp. 3516-3517, https://doi.org/10.1021/ja058440.

Meinardi et al., "Large-area luminescent solar concentrators based on 'Stokes-shift-engineered' nanocrystals in a mass-polymerized PMMA matrix", Nature Photonics, vol. 8, No. 5, Apr. 13, 2014, pp. 392-399, doi: 10.1038/NPHOTON.2014.54.

Miron et al., "SWIR Images Evaluation for Pedestrian Detection in Clear Visibility Conditions", Proceedings of the 16th International IEEE Annual Conference on Intelligent Transportation Systems (ITSC 2013), The Hague, The Netherlands, Oct. 6-9, 2013, pp. 354-359, DOI: 10.1109/ITSC.2013.6728257.

Olutas et al., "Lateral Size-Dependent Spontaneous and Stimulated Emission Properties in Colloidal CdSe Nanoplatelets", ACS Nano, vol. 9, No. 5, 2015, 5041-5050, https://doi.org/10.1021/acsnano.5b01927.

Schlosser et al., "CdS Crown Growth on CdSe Nanoplatelets: Core Shape Matters", Nanoscale Advances, vol. 2, No. 10, 2020, pp. 4604-4614. https://doi.org/10.1039/d0na00619j.

Van der Stam et al., "Solution-Processable Ultrathin Size- and Shape-Controlled Colloidal $Cu_2$—XS Nanosheets", Chemistry of Materials, vol. 27, No. 1, 2015, first published Dec. 4, 2014, pp. 283-291, https://doi.org/10.1021/cm503929q.

Weidman et al., "Monodisperse, air-stable PbS nanocrystals via precursor stoichiometry control", ACS Nano, vol. 8, No. 6, Jun. 24, 2014, published online May 23, 2014, pp. 6363-6371, doi: 10.1021/nn5018654.

Yadav et al., "Efficient Charge Extraction from CdSe/ZnSe Dots-on-Plates Nanoheterostructures", ACS Omega, vol. 2, No. 5, May 22, 2017, pp. 2231-2237, doi.org/10.1021/acsomega.7b00174.

Abecassis et al., "Self-Assembly of CdSe Nanoplatelets into Giant Micrometer-Scale Needles Emitting Polarized Light", Nano Letters, vol. 14, No. 2, Dec. 24, 2013, published online Jan. 6, 2013, pp. 710-715, https://doi.org/10.1021/nl4039746.

Anderson et al., "Ligand exchange and the stoichiometry of metal chalcogenide nanocrystals: spectroscopic observation of facile metal-carboxylate displacement and binding", Journal of the American Chemical Society, vol. 135, No. 49, Dec. 11, 2013, published online Nov. 26, 2013, pp. 18536-18548, doi: 10.1021/ja4086758.

Antu et al., "Bright colloidal PbS nanoribbons", Chemistry of Materials, vol. 30, No. 11, May 8, 2018, pp. 3697-3703, https://doi.org/10.1021/acs.chemmater.8b00467.

Bouet al., "Two-Dimensional Growth of CdSe Nanocrystals, from Nanoplatelets to Nanosheets", Chemistry of Materials, vol. 25, 2013, pp. 639-645, DOI: 10.1021/CM304080Q.

Cassette et al., "Synthesis and Characterization of Near-Infrared Cu—In—Se/ZnS Core/Shell Quantum Dots for In vivo Imaging", Chemistry of Materials, vol. 22, No. 22, Oct. 19, 2010, pp. 6117-6124, https://doi.org/10.1021/cm101881b.

Chen et al., "Quasi-2D Colloidal Semiconductor Nanoplatelets for Narrow Electroluminescence", Advanced Functional Materials, vol. 24, Issue 3, Jan. 22, 2014, first published Jul. 16, 2013, pp. 295-302, https://doi.org/10.1002/adfm.201301711.

Chen et al., "Surface-functionalization-dependent optical properties of II-VI semiconductor nanocrystals", Journal of the American Chemical Society, Nov. 2, 2011, published online Oct. 10, 2011, vol. 133, No. 43, pp. 17504-17512. doi: 10.1021/ja208337r.

Clark et al., "Resonant Energy Transfer in PbS Quantum Dots", The Journal of Physical Chemistry C, vol. 111, No. 20, May 3, 2007, pp. 7302-7305, https://doi.org/10.1021/jp0713561.

Dufour et al., "Halide Ligands To Release Strain in Cadmium Chalcogenide Nanoplatelets and Achieve High Brightness", ACS Nano, vol. 13, No. 5, May 28, 2019, published online Apr. 17, 2019, pp. 5326-5334, doi: 10.1021/acsnano.8b09794.

Goubet al., "Terahertz HgTe Nanocrystals: Beyond Confinement", Journal of the American Chemical Society, vol. 140, No. 15, Apr. 18, 2018, published online Apr. 10, 2018, pp. 5033-5036, doi: 10.1021/jacs.8b02039.

Ithurria et al., "Colloidal Atomic Layer Deposition (c-ALD) Using Self-Limiting Reactions at Nanocrystal Surface Coupled to Phase Transfer between Polar and Nonpolar Media", Journal of the American Chemical Society, vol. 134, No. 45, Oct. 12, 2012, pp. 18585-18590, https://doi.org/10.1021/ja308088d.

Ithurria et al., "Colloidal nanoplatelets with two-dimensional electronic structure", Nature Materials, vol. 10, No. 12, Oct. 23, 2011, pp. 936-941, doi: 10.1038/nmat3145.

Izquierdo et al., "Coupled HgSe Colloidal Quantum Wells through a Tunable Barrier: A Strategy To Uncouple Optical and Transport Band Gap", Chemistry of Materials, May 21, 2018, vol. 30, No. 12, pp. 4065-4072, doi: 10.1021/acs.chemmater.8b01028.

(56) References Cited

OTHER PUBLICATIONS

Izquierdo et al., "Strongly Confined HgTe 2D Nanoplatelets as Narrow Near-Infrared Emitters", Journal of the American Chemical Society, Aug. 3, 2016, vol. 138, No. 33, pp. 10496-10501, doi: 10.1021/jacs.6b04429.

Jagtap et al., "Short Wave Infrared Devices Based on HgTe Nanocrystals with Air Stable Performances", Journal of Physical Chemistry C, vol. 122, No. 26, 2018, pp. 14979-14985, DOI: 10.1021/acs.jpcc.8b03276ff.

Kelestemur et al., "CdSe/CdSe1-XTex Core/Crown Heteronanoplatelets: Tuning the Excitonic Properties without Changing the Thickness", Journal of Physical Chemistry C, vol. 121, No. 8, Feb. 1, 2017, pp. 4650-4658, https://doi.org/10.1021/acs.jpcc.6b11809DOI: 10.1021/acs.jpcc.6b11809.

Kurtina et al., "Atomically Thin Population of Colloidal CdSe Nanoplatelets: Growth of Rolled-up Nanosheets and Strong Circular Dichroism Induced by Ligand Exchange", Chemistry of Materials, vol. 31, No. 23, Nov. 2019, pp. 9652-9663, DOI:10.1021/acs.chemmater.9b0292.

Li et al., "Area- and Thickness-Dependent Biexciton Auger Recombination in Colloidal CdSe Nanoplatelets: Breaking the "Universal vol. Scaling Law, Nano Letters, vol. 17, No. 5, May 10, 2017, published online Apr. 20, 2017, pp. 3152-3158, https://doi.org/10.1021/acs.nanolett.7b00587.

Ma et al., "Size-Dependent Biexciton Quantum Yields and Carrier Dynamics of Quasi-Two-Dimensional Core/Shell Nanoplatelets", ACS Nano, vol. 11, No. 9, 2017, pp. 9119-9127, https://doi.org/10.1021/acsnano.7b03943.

Martinez et al., "HgTe Nanocrystal Inks for Extended Short-Wave Infrared Detection", Advanced Optical Materials, vol. 7, Issue 15, Aug. 5, 2019, 1900348, first published May 20, 2019, https://doi.org/10.1002/adom.2019003481900348.

Melchoir et al., "Photodetectors for optical communication systems", Proceedings of the IEEE, vol. 58, Issue 10, Oct. 1970, pp. 1466-1486, Doi: 10.1109/PROC. 1970.7972.

Mirzai et al., "The room temperature phosphine-free synthesis of near-infrared emitting HgSe quantum dots", Journal of Materials Chemistry, vol. 2, No. 12, Mar. 2014, pp. 2107-2111, DOI: 10.1039/c4tc00037d.

Moreels et al., "Size-dependent optical properties of colloidal PbS quantum dots", ACS Nano, vol. 3, No. 10, Oct. 27, 2009, pp. 3023-3030, doi: 10.1021/nn900863a.

Naeem et al., "Giant Exciton Oscillator Strength and Radiatively Limited Dephasing in Two-Dimensional Platelets", Physical Review B, vol. 91, Issue 12, Mar. 30, 2015, 12 pgs, DOI:https://doi.org/10.1103/PhysRevB.91.121302.

Nienhaus et al., "Speed Limit for Triplet-Exciton Transfer in Solid-State PbS Nanocrystal-Sensitized Photon Upconversio", ACS Nano, vol. 11, No. 8, Aug. 22, 2017, published online Jul. 26, 2017, pp. 7848-7857, doi: 10.1021/acsnano.7b02024.

Pedetti et al., "B. Type-II CdSe/CdTe Core/Crown Semiconductor Nanoplatelets", Journal of the American Chemical Society, vol. 136, No. 46, Nov. 19, 2014, published online Nov. 6, 2014, pp. 16430-16438, https://doi.org/10.1021/ja509307m.

Pedetti et al., "Optimized Synthesis of CdTe Nanoplatelets and Photoresponse of CdTe Nanoplatelets Films", Chemistry of Materials, May 21, 2013, vol. 25, No. 12, pp. 2455-2462, doi: 10.1021/cm4006844.

Piepenbrock et al., "A Low-Temperature Synthesis for Organically Soluble HgTe Nanocrystals Exhibiting Near-Infrared Photoluminescence and Quantum Confinement", Journal of the American Chemical Society, vol. 128, No. 21, Jun. 2006, pp. 7087-7090, DOI: 10.1021/ja060721j.

Pietryga et al., "Pushing the band gap envelope: mid-infrared emitting colloidal PbSe quantum dots", Journal of the American Chemical Society, vol. 126, No. 38, Sep. 29, 2004, pp. 1752-1753, doi: 10.1021/ja047659f.

Rurack et al., "Fluorescence quantum yields of a series of red and near-infrared dyes emitting at 600-1000 nm", Analytical Chemistry, vol. 83, No. 4, Feb. 15, 2011, published online Jan. 20, 2011, pp. 1232-1242, doi: 10.1021/ac101329h.

Semonin et al., "Absolute Photoluminescence Quantum Yields of IR-26 Dye, PbS and PbSe Quantum Dots", Journal of Physical Chemistry Letters, vol. 1, Issue 16, Jul. 28, 2010, pp. 2245-2250, https://doi.org/10.1021/jz100830r.

Shamsi et al., "Colloidal Synthesis of Quantum Confined Single Crystal CsPbBr3 Nanosheets with Lateral Size Control up to the Micrometer Range", Journal of the American Chemical Society, vol. 138, No. 23, Jun. 6, 2016, published online May 26, 2016, pp. 7240-7243, https://doi.org/10.1021/jacs.6b03166.

She et al., "Red, Yellow, Green, and Blue Amplified Spontaneous Emission and Lasing Using Colloidal CdSe Nanoplatelets", ACS Nano, vol. 9, No. 10, Oct. 27, 2015, published online Sep. 9, 2015, pp. 9475-9485. doi: 10.1021/acsnano.5b02509.

Shin et al., "Dielectric Screening Modulates Semiconductor Nanoplatelet Excitons", Journal of the Physical Chemistry Letters, vol. 12, No. 20, May 27, 2021, published online May 18, 2021, pp. 4958-4964, doi: 10.1021/acs.jpclett. 1c00624.

Singh et al., "Colloidal CdSe Nanoplatelets, A Model for Surface Chemistry/Optoelectronic Property Relations in Semiconductor Nanocrystals", Journal of the American Chemical Society, vol. 140, No. 41, Oct. 17, 2018, published online Oct. 5, 2018, pp. 13292-13300, doi: 10.1021/jacs.8b07566.

Tenney et al., "Mercury Chalcogenide Nanoplatelet-Quantum Dot Heterostructures as a New Class of Continuously Tunable Bright Shortwave Infrared Emitters", J. Phys. Chem. Lett., vol. 11, No. 9, Apr. 15, 2020, pp. 3473-3480, https://doi.org/10.1021/acs.jpclett.0c0095.

Tessier et al., "Efficient Exciton Concentrators Built from Colloidal Core/Crown CdSe/CdS Semiconductor Nanoplatelets", Nano Letters, vol. 14, No. 1, Jan. 2014, pp. 207-213, https://doi.org/10.1021/nl403746p.

Tessier et al., "Spectroscopy of Colloidal Semiconductor Core/Shell Nanoplatelets with High Quantum Yield", Nano Letters, vol. 13, No. 7, Jun. 3, 2013, pp. 3321-3328, https://doi.org/10.1021/nl401538n.

Tessier et al., "Spectroscopy of single CdSe nanoplatelets", ACS Nano, vol. 6, No. 8, Aug. 28, 2012, published online Jul. 23, 2012, pp. 6751-6758, doi: 10.1021/nn3014855.

Williams et al., "Synthesis of Type I PbSe/CdSe Dot-on-Plate Heterostructures with Near-Infrared Emission", Journal of the American Chemical Society, vol. 141, No. 13, Apr. 3, 2019, published online Mar. 32, 2019, pp. 5092-5096, doi: 10.1021/jacs.8b13794.

Yeltik et al., "Experimental Determination of the Absorption Cross-Section and Molar Extinction Coefficient of Colloidal CdSe Nanoplatelets", Journal of Physical Chemistry B, vol. 110, No. 50, Dec. 21, 2006, pp. 25322-25331, doi: 10.1021/jp066034w.

Bowers II et al., "White-Light Emission from Magic-Sized Cadmium. Selenide Nanocrystals", Journal of the American Chemical Society, vol. 127, No. 44, pp. 15378-15379, DOI: 10.1021/ja055470d.

* cited by examiner

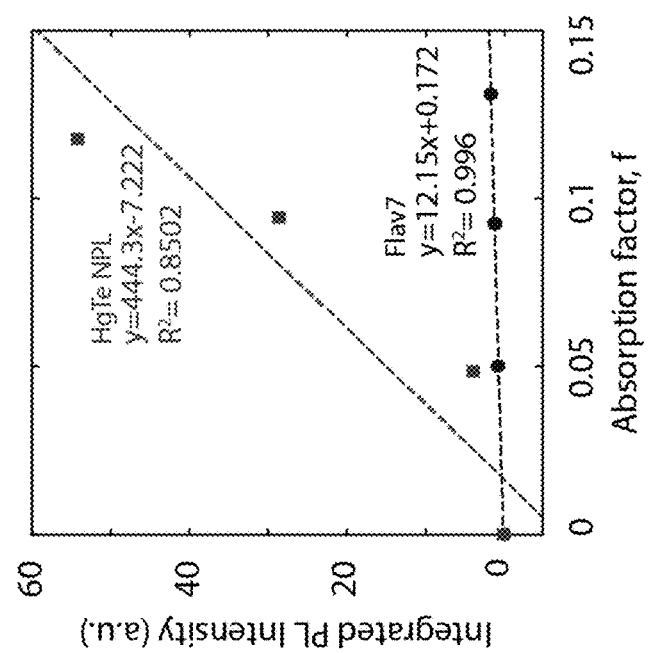
FIG. 9C
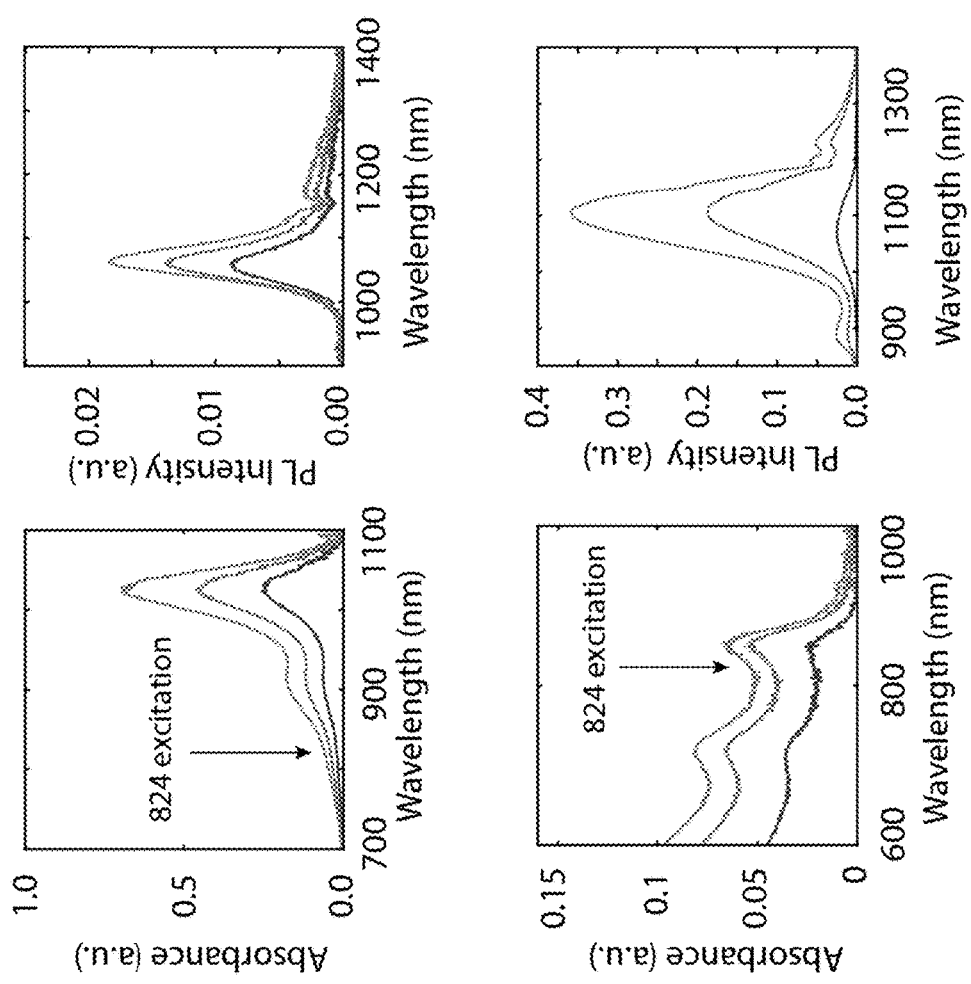
FIG. 9A
FIG. 9B

FIG. 17A
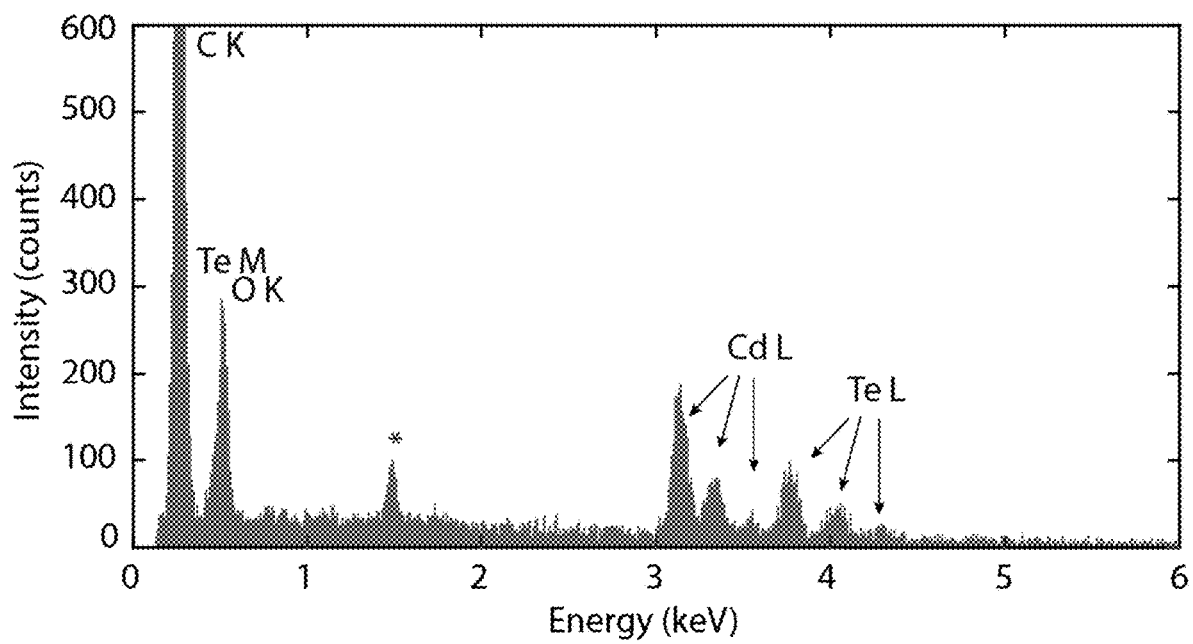
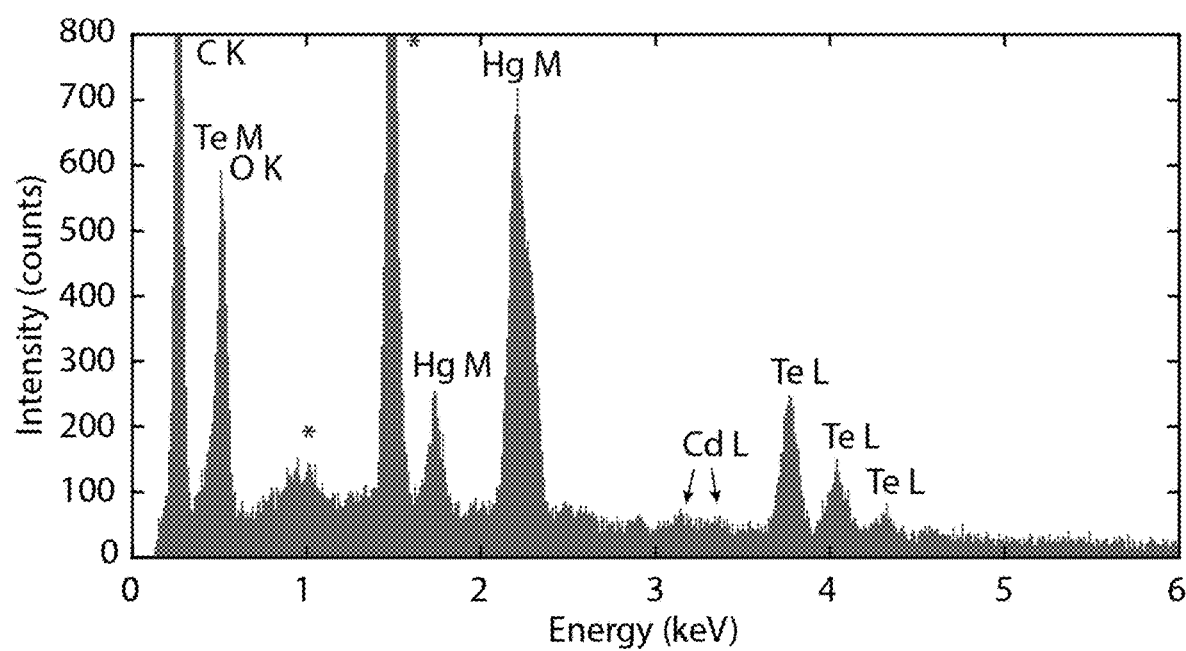
FIG. 17B

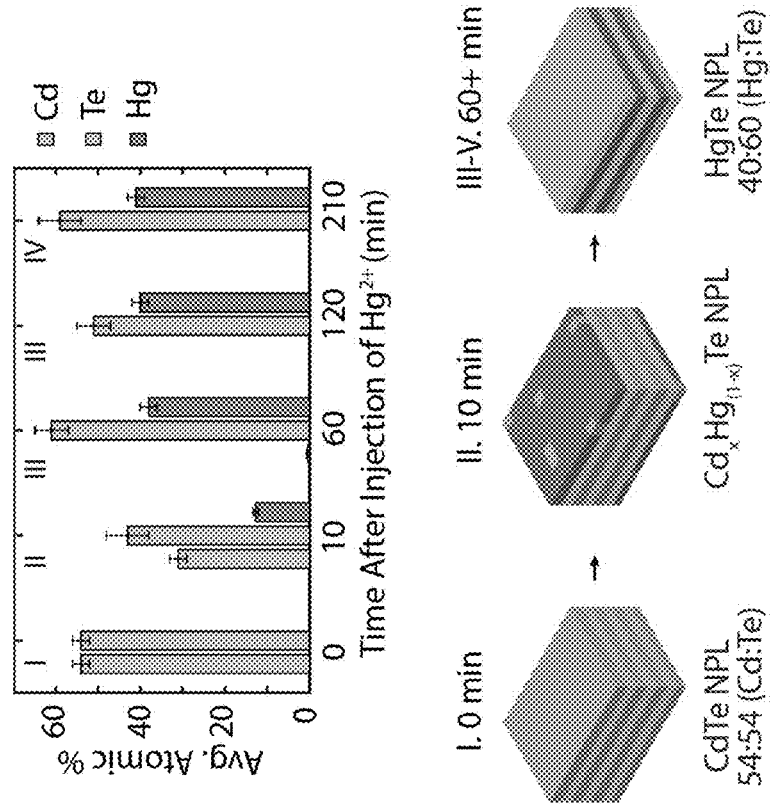
FIG. 21C
FIG. 21D
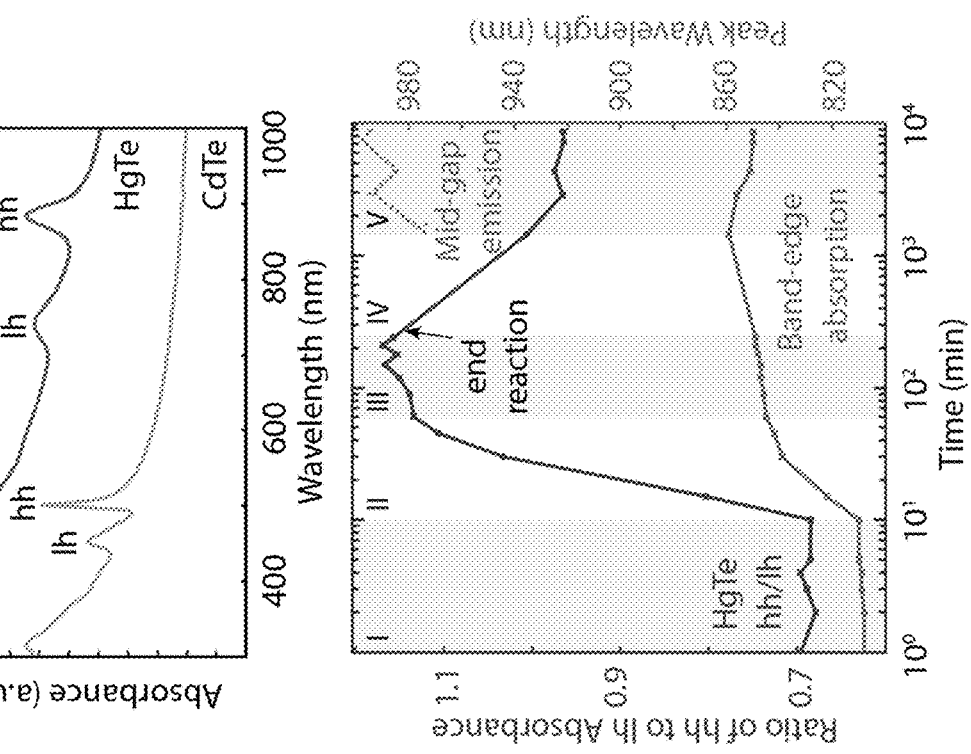
FIG. 21A
FIG. 21B

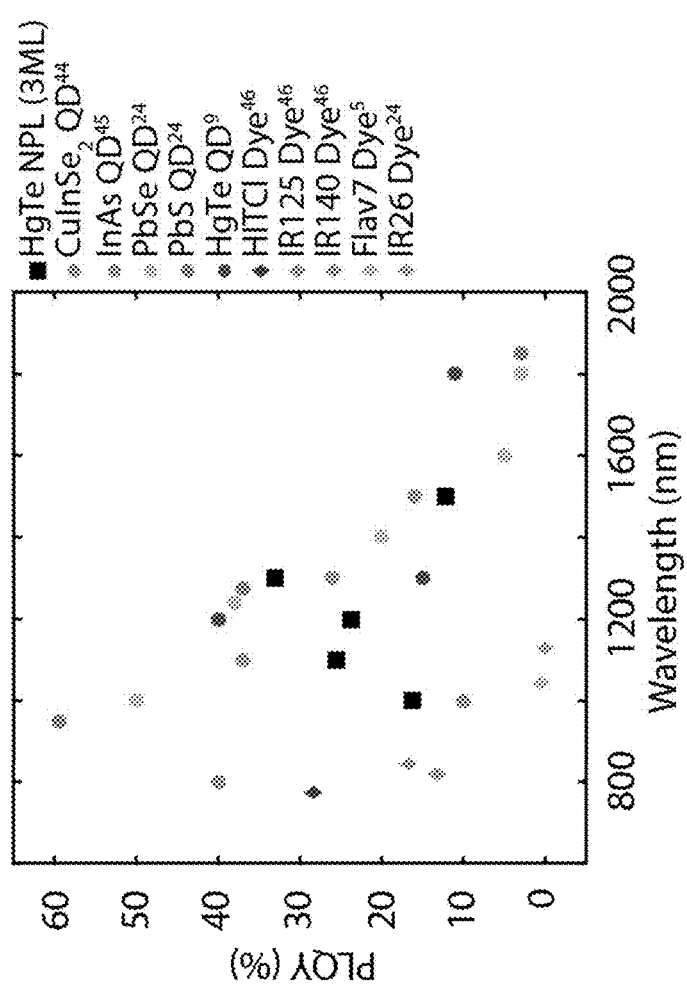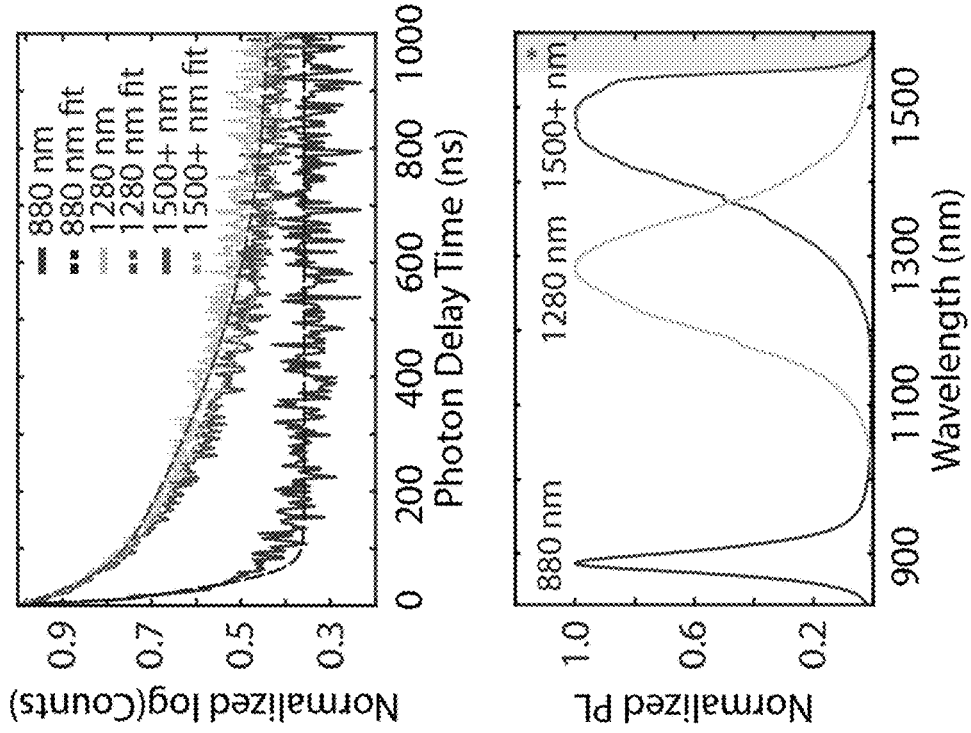
FIG. 25A
FIG. 25B
FIG. 25C

| Photoluminescence | A | 1/τ (ns⁻¹) | τ (ns) | Amplitude (%) | Fit RMSE | Average Lifetime (ns) |
|---|---|---|---|---|---|---|
| 880 nm (BE) | 5585.5 | 0.4356 | 2.29 | 90 | 0.9956 | 7.4 |
|  | 645.2 | 0.0689 | 14.5 | 10 |  |  |
| 900 nm (BE) + 1100 nm (mid-gap) | 385.5 | 0.2160 | 4.63 | 79 | 0.9035 | 32.6 |
|  | 104.9 | 0.0230 | 43.5 | 21 |  |  |
| 1200 nm (mid-gap) | 12508 | 0.0750 | 13.33 | 75 | 0.9836 | 131.9 |
|  | 4227 | 0.0062 | 161 | 35 |  |  |
| 1300 nm (mid-gap) | 1377.6 | 0.0384 | 26.1 | 76 | 0.9807 | 135.3 |
|  | 425.5 | 0.0054 | 185.12 | 24 |  |  |
| 1500 nm (mid-gap) | 803.7 | 0.0369 | 27.09 | 74 | 0.9740 | 122.4 |
|  | 278.7 | 0.0060 | 167.0 | 26 |  |  |

FIG. 26

SYSTEMS AND METHODS FOR QUANTUM DOT ON NANOPLATELET HETEROSTRUCTURES WITH TUNABLE EMISSION IN THE SHORTWAVE INFRARED

CROSS-REFERENCE TO RELATED APPLICATIONS

The current application claims the benefit of and priority under 35 U.S.C. § 119(e) to U.S. Provisional Patent Application No. 63/073,762 entitled "Mercury Chalcogenide Quantum Dot on Nanoplatelet Heterostructures with Tuneable Emission in the Shortwave Infrared" filed Sep. 2, 2020. The disclosure of U.S. Provisional Patent Application No. 63/073,762 is hereby incorporated by reference in its entirety for all purposes.

STATEMENT OF FEDERALLY SPONSORED RESEARCH

This invention was made with government support under Grant Number 1905242 and 1945572, awarded by the National Science Foundation. The government has certain rights in the invention.

FIELD OF THE INVENTION

The present invention generally relates to systems and methods for nanoscale and mesoscale nanoplatelets; and more particularly to systems and methods for quantum dot on nanoplatelet heterostructures with tuneable emission in the shortwave infrared.

BACKGROUND OF THE INVENTION

Photons in the shortwave infrared (SWIR) spectral window are lower in energy than most molecular HOMO-LUMO gaps, yet higher in energy than vibrational states. Without natural sources of background radiation or absorption, imaging in this spectral window shows superlative contrast and feature resolution. Decreased Rayleigh scatter for longer wavelength light also results in improved penetrative imaging—through fog, foliage, skin and bone. Fluorescent microscopy in the SWIR has shown background-free deep tissue imaging in living animals. Increasing the scope of SWIR absorbing and fluorescing materials may enable applications in sensing biological, chemical or physical changes in complex and opaque environments.

BRIEF SUMMARY OF THE INVENTION

Systems and methods for quantum dot on nanoplatelet heterostructures with tunable emission in the SWIR are illustrated. Many embodiments provide that quantum dots and nanoplatelets can be made of II-VI semiconductors. In several embodiments, quantum dots (QDs) and nanoplatelets (NPLs) can be made from II-VI semiconductors including (but not limited to) cadmium chalcogenide (CdX), and mercury chalcogenide (HgX). Some embodiments provide that chalcogenide (X) can include (but are not limited to) sulfur (S), selenium (Se), and tellurium (Te). A number of embodiments provide that QDs and NPLs can be made with the same or different II-VI semiconductor materials. In many embodiments, NPLs can be induced to emit bright infrared emission (quantum yield, QY). Several embodiments provide that quantum yield of QD NPL heterostructures can be greater than 30%. In many embodiments, quantum dots (QDs) can be attached to NPLs to tune the emission of the NPLs. Some embodiments include that the NPLs can have tunable infrared (wavelength between about 900 nm to at least 1500 nm) emission from attached QDs. Many embodiments provide that QD-NPL heterostructures can be applied to broad applications due to tunable optical properties and relatively larger sizes compared to QDs.

Many embodiments provide that II-VI semiconductor NPLs can have lateral dimensions in the range from nanometers to microns. Several embodiments provide synthesis methods to make nanoscale and mesoscale (greater than 1 micron) NPLs. In several embodiments, NPLs have a longest side length of at least 50 nm. Some embodiments provide that the longest side length of NPLs can be greater than 1 micron. Many embodiments provide seeded growth methods for mesoscale NPLs. Several embodiments provide seeded growth methods for QDs on NPLs. A number of embodiments provide that NPLs at mesoscale can be integrated into applications including (but not limited to) single nanocrystal devices.

One embodiment of the invention includes a tunable light emitter comprising a nanoplatelet heterostructure, wherein the nanoplatelet heterostructure comprises at least two monolayers of a II-VI semiconductor material and at least one quantum dot on a first surface of the nanoplatelet heterostructure, where the at least one quantum dot tunes emission of the nanoplatelet heterostructure and the nanoplatelet heterostructure emits in wavelength range from about 900 nm to at least 1500 nm.

In a further embodiment, the nanoplatelet heterostructure is a two-dimensional structure with quantum confinement along its integer atomic thickness.

In an additional embodiment, the II-VI semiconductor material is mercury chalcogenide or cadmium chalcogenide, wherein chalcogenide is selected from the group consisting of sulfide, selenide, and telluride.

In another embodiment, the nanoplatelet heterostructure comprises at least two monolayers of mercury selenide, three monolayers of mercury selenide, two monolayers of mercury telluride, three monolayers of mercury telluride, two monolayers of cadmium selenide, three monolayers of cadmium selenide, four monolayers of cadmium selenide, five monolayers of cadmium selenide, two monolayers of cadmium telluride, or three monolayers of cadmium telluride.

In a further embodiment again, the light emitter has a quantum yield of greater than 30%.

In yet another embodiment, the nanoplatelet heterostructure has a lateral dimension of at least 100 nanometers.

In a still further embodiment, the nanoplatelet heterostructure has a lateral dimension of at least 1 micron.

In a yet further embodiment again, the nanoplatelet heterostructure has a surface area from about $6 \times 10^5$ nm$^2$ to about $1 \times 10^6$ nm$^2$.

In another embodiment again, the at least one quantum dot is grown on the first surface of the nanoplatelet heterostructure in-situ or ex-situ.

In a still yet further embodiment, the at least one quantum dot comprises a II-VI semiconductor material.

In still yet another embodiment, the II-VI semiconductor material is mercury chalcogenide or cadmium chalcogenide, wherein chalcogenide is selected from the group consisting of sulfides, selenides, and tellurides Still another additional embodiment includes a method of synthesizing a nanoplatelet heterostructure comprising:
  providing at least one II-VI semiconductor seed, wherein the seed comprises at least one nanoplatelet;

suspending the at least one II-VI semiconductor seed in a solution;
adding at least one metal precursor in the solution;
adding at least one chalcogen precursor to the solution at an injection rate
heating the solution to at least 180° C.;
cooling the heated solution; and
precipitating the nanoplatelet heterostructure;
wherein the nanoplatelet heterostructure has a lateral dimension of at least 1 micron.

In a yet further embodiment, the injection rate is less than 1 mL/hour.

In still another embodiment, the injection rate is less than 0.55 mL/hour.

In an additional embodiment again, the solution is heated to a temperature between about 220° C. to about 240° C.

In still yet another embodiment, the metal precursor is cadmium precursor or mercury precursor.

In a yet further embodiment, the II-VI semiconductor material is mercury chalcogenide or cadmium chalcogenide, wherein chalcogenide is selected from the group consisting of sulfides, selenides, and tellurides.

In yet another embodiment again, the chalcogen precursor is tri-n-octylphosphine sulfide or tri-n-octylphosphine telluride.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 9A-9C illustrate the relative quantum yield determination of HgTe nanoplatelets (NPLs) in accordance with embodiments.

FIGS. 17A-17B illustrate elemental Dispersive X-Ray Spectroscopy (EDX) of CdTe NPLs and HgTe NPLs in accordance with embodiments.

FIG. 21A illustrates the absorption spectra for CdTe and HgTe NPL and their light hole (lh) and heavy hole (hh) features in accordance with embodiments.

FIG. 21B illustrates the ratio of HgTe hh/lh and wavelength of hh monitored by changes in the absorption spectrum during different timepoints of exchange in accordance with embodiments.

FIG. 21C illustrates energy dispersive spectroscopy (EDX) monitoring stoichiometry changes during exchange in accordance with embodiments.

FIG. 21D illustrates a mechanism for observed stoichiometry changes where Hg atoms are removed from the nanoplatelet surfaces in accordance with embodiments.

FIG. 25A illustrates photoluminescence lifetime from HgTe nanoplatelets showing band-edge and two samples with varying mid-gap emission in accordance with embodiments.

FIG. 25B illustrates the corresponding photoluminescence spectra in accordance with embodiments.

FIG. 25C illustrates the quantum yield of organic dye and quantum dot fluorophores across the near infrared and shortwave infrared in accordance with embodiments.

FIG. 26 illustrates the fit parameters and average lifetimes for HgTe NPLs showing band edge (BE) emission, mixed band edge and mid-gap emission, and mid-gap emission in accordance with embodiments.

DETAILED DESCRIPTION OF THE INVENTION

Figure 1:
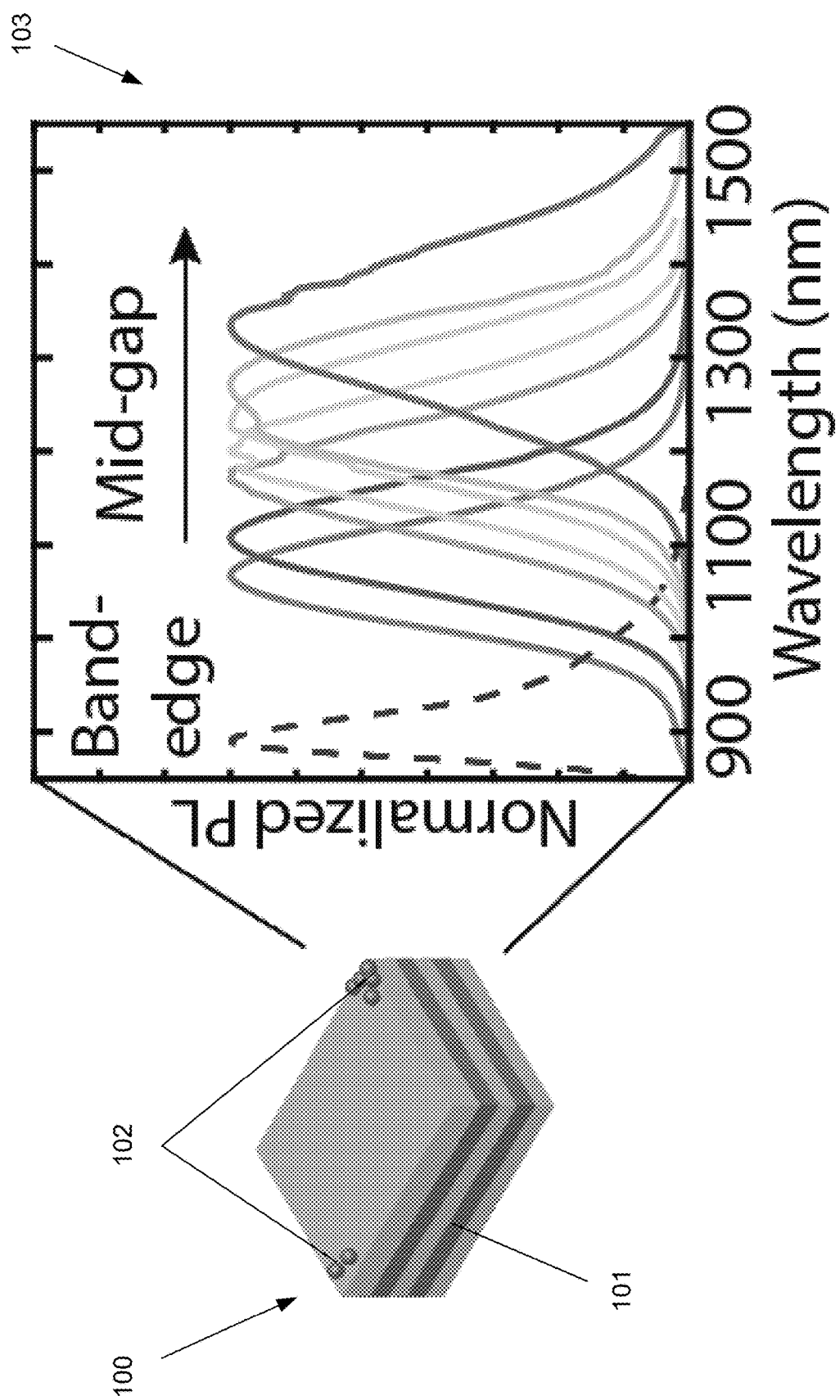
FIG. 1 illustrates a schematic of a II-VI semiconductor nanoplatelet-quantum dot heterostructure with tunable emission in SWIR in accordance with embodiments.

Turning now to the drawings, systems and methods for II-VI semiconductor nanoplatelet (NPL)—quantum dot (QD) heterostructures with tunable emission in shortwave infrared (SWIR), are described. Despite broad applications in imaging, energy conversion and telecommunications, there are few nanoscale moieties that emit light efficiently in the shortwave infrared (SWIR, wavelength from about 1000 nm to about 2000 nm or about 1.24 eV-0.62 eV). Many embodiments provide that II-VI semiconductor NPLs can be induced to emit bright infrared emission (quantum yield, QY). The quantum yield of infrared emission can be greater than 30% for QD NPL heterostructures. In several embodiments, QDs and NPLs can be made from II-VI semiconductors including (but not limited to) cadmium chalcogenide (CdX), and mercury chalcogenide (HgX). Some embodiments provide that chalcogenide (X) can include (but are not limited to) sulfur (S), selenium (Se), and tellurium (Te). QDs and NPLs can be made with the same or different II-VI semiconductor materials in accordance with several embodiments. Some embodiments provide that the NPLs can have tunable infrared (wavelength between about 900 nm to at least 1500 nm) emission from attached quantum dots (QDs). The QDs can act as "defect" states. Some embodiments provide that the NPLs can transfer energy to the QDs in the heterostructures and enable bright emission. Several embodiments provide near unity energy transfer from NPLs to QDs. In such embodiments, near unity energy transfer from NPLs to QDs can quench NPL emission and emit with high QY through the SWIR. In several embodiments, the size of the QDs on the NPLs can determine the wavelength of emitted light. QDs by themselves can emit across the SWIR wavelengths. CdX and HgX NPLs alone may not emit in the SWIR beyond 800 nm. Coupling QDs with NPLs in the heterostructures enable bright emission across the SWIR in accordance with several embodiments. In many embodiments, NPLs bring the advantage of being larger in size when coupling with QDs such that QD NPL heterostructures can have broad applications in optoelectronics.

In several embodiments, II-VI semiconductor QDs can have a diameter in the range from about 2 nm to about 10 nm. Many embodiments provide that II-VI semiconductor NPLs can have lateral dimensions in the range from nanometers to microns. Several embodiments provide synthesis methods to make nanoscale and mesoscale (greater than 1 micron) NPLs. Many embodiments provide seeded growth methods for mesoscale NPLs and for QD on NPL heterostructures. The synthesis methods including (but not limited to) cation exchange methods in accordance with certain embodiments can limit the thickness of the NPL heterostructures during growth to enable emission tuning in the infrared wavelength ranges. In some embodiments, NPLs have a longest side length of at least 50 nm. Certain embodiments provide that the longest side length of NPLs is at least 100 nm. A number of embodiments provide seeded growth processes of mesoscale NPLs. Some embodiments provide that the lateral dimensions of NPLs can be greater than 1 micron. In certain embodiments, the lateral dimensions of NPLs can be from about 1 micron to about 1.6 microns. A number of embodiments provide that NPLs at mesoscale can be integrated into applications including (but not limited to) single nanocrystal devices.

In several embodiments, the QD defect emission can be kinetically tunable, enabling controlled mid-gap emission from NPLs. Many embodiments provide that QD NPL heterostructures can have energy dependent lifetimes. Some embodiments provide that the II-VI semiconductor QD NPL heterostructures can have radiative rates about 10 to 20 times faster than their PbX analogs in the same spectral window. Coupled with the high quantum yield and mid-gap emission, QDs on NPLs heterostructures can have broad applications for novel optoelectronics in the SWIR. Many embodiments provide that the tunable emission and radiative lifetimes while maintaining the large area NPL morphology render QD on NPL heterostructures applicable in higher flux light emission technologies including (but not limited to) LEDs, sensors, and single photon emitters.

Quantum Dot on Nanoplatelet Heterostructures

Many embodiments provide heterostructures comprising QDs on II-VI semiconductor NPLs. In several embodiments, the QDs can be grown in-situ with NPLs. In some embodiments, the QDs can be grown ex-situ and then mixed with NPLs. A number of embodiments provide that heterostructures with QDs grown in-situ with NPLs exhibit higher quantum yield possibly due to more efficient energy transfer from NPLs to QDs. In several embodiments, II-VI QDs and NPLs can be made from II-VI semiconductors including (but not limited to) cadmium chalcogenide (CdX), and mercury chalcogenide (HgX). Some embodiments provide that chalcogenide (X) can include (but are not limited to) S, Se, and Te. Many embodiments provide that II-VI semiconductor NPLs can include at least two monolayers (ML). A number of embodiments implement 2 ML (with thickness of about 5 atoms thick, or about 0.9 nm) and/or 3 ML (with thickness of about 7 atoms thick, or about 1.2 nm) metal chalcogen heterostructures. Some embodiments provide that with greater than about 6 ML, the heterostructures may lose their optical confinement and behave like bulk semiconductors. In certain embodiments, HgX infrared emitting NPLs can have a thickness no greater than 3 ML. NPLs are 2D structures with quantum confinement along their integer atomic thicknesses, where the number of monolayers can be defined by the number of anionic layers. Several embodiments provide that NPLs can have a zinc blende structure and alternating planes of atoms. In some embodiments, a 3 ML structure can include (from top to bottom) M, X, M, X, M, X, M, where M can be metal and X can be chalcogen. The number of monolayers corresponds to the number of chalcogen atoms. For example, a 3 ML HgX NPL can include 3 layers of X and 4 layers of Hg. The spatial extent, material constituents, and self-assembly of NPLs can be tuned to achieve a versatile set of photophysical properties and applications, including near unity exciton and biexciton quantum yield, efficient lasing, electroluminescence, and usage as substrates for photodetectors.

Several embodiments provide that II-VI semiconductor NPLs can have lateral dimensions in the range from nanometers to microns. Several embodiments provide synthesis methods to make nanoscale and mesoscale (greater than 1 micron) NPLs. A number of embodiments provide II-VI NPLs with a lateral extent that can exceed the wavelength of light used to excite them, while maintaining their size-confinement in the thickness dimension. Some embodiments provide that the lateral dimensions of NPLs can be greater than 1 micron. In certain embodiments, the lateral dimensions of NPLs can be from about 1 micron to about 1.5 microns. In several embodiments, the areas of the mesoscale NPLs can be from about $6 \times 10^5$ to about $1 \times 10^6$ $nm^2$. Many embodiments provide that integration of the mesoscale II-VI NPLs into QD NPL heterostructures makes them amenable to applications that may not be applicable for QDs.

Several embodiments provide that the NPLs can have tunable infrared emission from attached QDs in wavelength range from about 900 nm to at least 1500 nm. Some embodiments provide near energy unity transfer from NPLs to QDs in the heterostructures that enable bright emission and/or high quantum yield. In certain embodiments, the quantum yield can be greater than 30%.

In many embodiments, heterostructures of II-VI semiconductor NPLs coupling with QDs exhibit bright and tunable emission. Some embodiments provide bright and continuously tunable mid-gap state emission in HgX NPL heterostructures by post-synthetic growth of QD-like surface defects. In several embodiments, quantum yields for these emissive states can be greater than 30%. In some embodiments, quantum yields can be comparable to the infrared emitting PbX and HgTe QDs, while showing faster radiative rates of about 430 ns without added optimizations. Certain embodiments provide that the energy of the mid-gap state can be a function of both cation and ligand exchange properties and can be consistent with slow activated growth of HgX QD defects on the NPL structure. The mechanism of the SWIR evolution can be applicable to the family of II-VI nanoplatelets including (but not limited to) HgX nanoplatelets, CdX nanoplatelets, 2 ML HgTe and 3 ML HgSe in accordance with several embodiments.

A schematic of QD NPL heterostructures with tunable emission in SWIR in accordance with an embodiment of the invention is illustrated in FIG. 1. A QD NPL heterostructure (100) includes II-VI NPLs (101) and QDs (102). II-VI NPLs (101) can be made of CdX or HgX, and X can be S, Se, or Te. NPLs (101) can include at least one cationic layer (Cd or Hg) and at least one anionic layer (X). NPLs can have lateral dimension ranging from nanometers to micrometers (greater than 1 micron). QDs (102) can be attached to the top of the NPLs. QDs can tune the optical emission of NPLs, and enable mid-gap emission in SWIR from about 900 nm to at least 1500 nm. NPLs can transfer energy to QDs to enable bright emission. Normalized photoluminescence (PL) at wavelengths from about 900 nm to about 1500 nm (103) shows tunable emission of the QD NPL heterostructures.

Synthesis of Mesoscale NPLs

II-VI Semiconductor nanoplatelets (NPLs) are a class of nanocrystals with precise confinement in the thickness dimension. They show great photophysical properties including narrow linewidths, tunable thicknesses, large absorption cross sections, and high quantum yields. They are also structurally versatile, able to vary in composition, shape, and are amenable towards lateral and longitudinal heterostructures all while maintaining their discrete monolayer (ML) thicknesses. NPLs can also exhibit properties similar to Van der Waals 2D materials including dielectric screening by external environments, and thickness dependent band-structure.

While Cd and HgX NPLs can be routinely synthesized with lateral dimensions up to about 500 nm, some of the largest shown sizes have only reached 700 nm to 800 nm. (See, e.g. Pedetti, S., et al., Chem. Mater., 2013, 25; the disclosure of which is incorporated by reference in its entirety.) Many interesting properties arise from lateral size dependence in NPLs including the absorption cross section, giant oscillator strength, spontaneous and stimulated emission thresholds, biexciton quantum yield, and auger recombination—properties of which have not been extensively explored in larger NPLs. Ultrathin nanosheets of other semiconducting materials have been demonstrated such as $Cu_{2-x}S$, $In_2Se_3$, PbS, perovskite $CsPbBr_3$, as well as transition metal dichalcogenides (TMD), but robust control of large area II-VI nanosheets with optical properties akin to their highly-confined small area analogs has not been shown.

Many embodiments provide synthesis methods for large area NPLs. Several embodiments use modified seeded growth methods for large area NPLs. Seeded growth has been used for extending small CdSe NPLs and for core-crown NPL growth. In a core-crown growth, a pre-synthesized amount of NPLs can be used as seeds and a second reaction may introduce a chalcogen precursor of a different composition to yield a heterostructure. Some embodiments utilize seeded growth while perform a slow controlled injection of the chalcogen precursor. Certain embodiments provide that the yielded NPLs can be at least 2 times bigger in size. A number of embodiments are able to grow CdTe and HgTe NPLs to a lateral extent that can exceed the wavelength of light used to excite them, all while maintaining their size-confinement in the thickness dimension.

Many embodiments provide a seeded growth process that can be used to consistently generate high-quality II-VI NPLs with sizes larger than 1 micron. In several embodiments, the areas of the mesoscale NPLs can be from about $6 \times 10^5$ to about $1 \times 10^6$ $nm^2$. The mesoscale NPLs can be solution processable in accordance with some embodiments. A number of embodiments provide that the size of the mesoscale II-VI NPLs may make them amenable to imaging resolutions that have not been possible for traditional quantum-confined nanocrystals such as their quantum dot counterparts.

Many embodiments provide that the larger NPLS can retain their optical profiles including (but not limited to) absorption profiles and emission profiles after the seeded growth process. In a number of embodiments, slow seeded growth processes can facilitate NPL seeds to reach mesoscale and produce NPLs with larger than 1 micron in lateral dimensions. Some embodiments provide that using slow injection without seeds or fast injection with seeds may not produce NPLs larger than about 500 nm.

In many embodiments, the seeded growth processes of mesoscale NPLs can start with NPL seeds in a solution inside a vessel. Metal precursors including (but not limited to) Hg precursors or Cd precursors can be in the same solution in accordance with some embodiments. In several embodiments, chalcogen precursors can be injected into the solution at an injection rate. The solution can be kept at an elevated temperature for the synthesis to occur. Several embodiments provide parameters including (but not limited to) temperature, precursor injection rate, and NPL seed concentration, for synthesizing mesoscale NPLs. Many embodiments provide that the synthesis parameters can control the growth rate, the size, and/or the size distribution of mesoscale NPLs. Certain embodiments provide temperature dependence on NPL sizes in seeded growth processes. In some embodiments, a slightly elevated reaction temperature relative to the initial seed growth temperature can result in large extended NPLs. In a number of embodiments, temperatures slightly elevated (for example, ranging from about 220° C. to about 240° C.) relative to the initial seed growth (for example, at about 210° C.) can result in large extended NPLs, but in a broad size distribution. In certain embodiments, at temperatures beyond about 230° C., NPLs appear to be smaller than the seed NPLs nucleate during the growth. Several embodiments provide that fast precursor injection rates (from about 1 mL/hour to about 2 mL/hour) and/or high concentrations of NPL seeds concentration (greater than about $6 \times 10^{-3}$ nmol) can favor nucleating small NPLs. In certain embodiments, slow injection rates (lower than about 0.55 mL/hour) and low concentrations (from about $1 \times 10^{-3}$ nmol to about $3.5 \times 10^{-3}$ nmol) of NPL seeds can form large NPLs.

Figure 2:
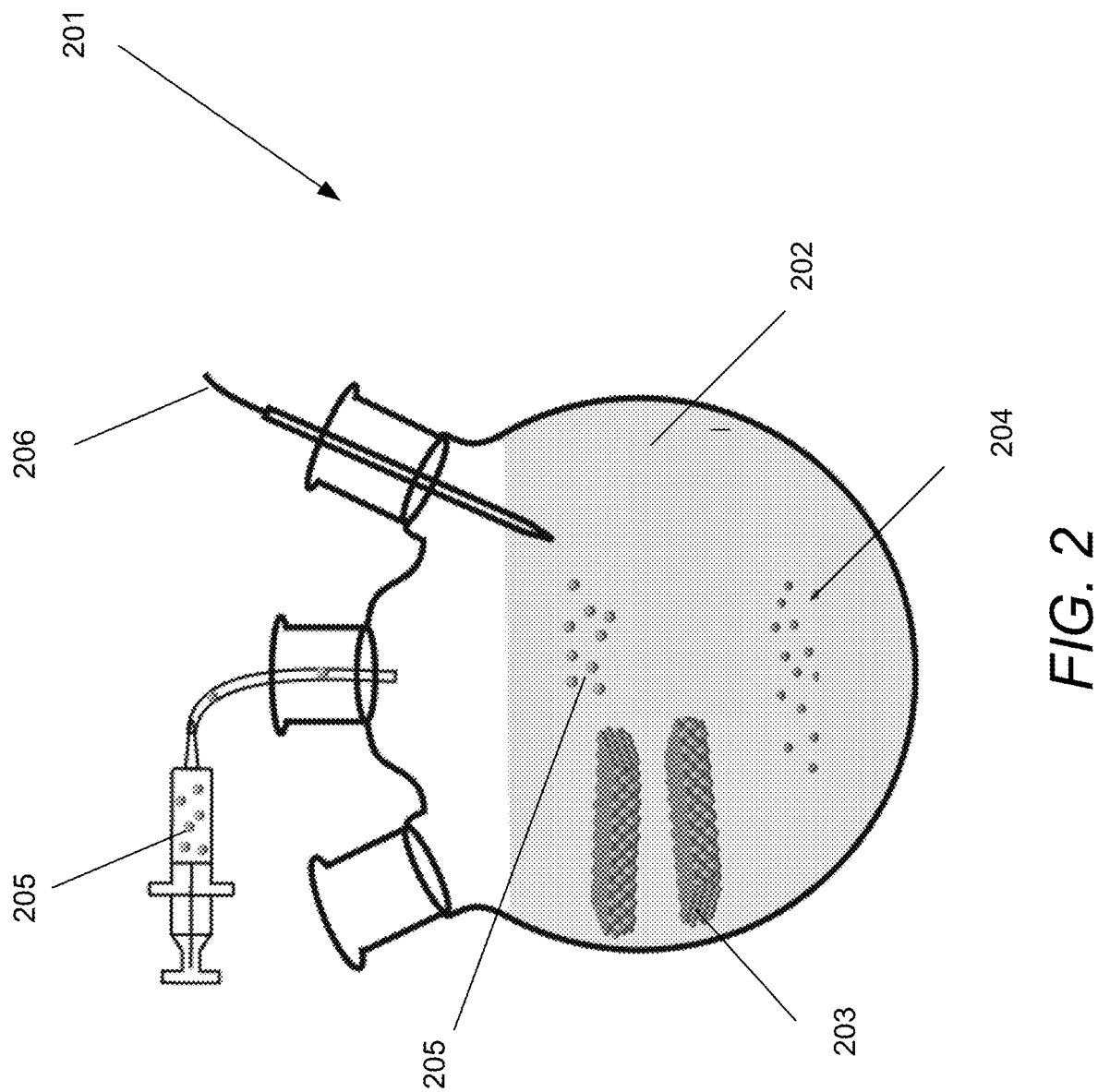
FIG. 2 illustrates a schematic of synthesis setup for NPL heterostructures in accordance with embodiments.

A schematic of synthesis set up for mesoscale NPLs in accordance with an embodiment of the invention is illustrated in FIG. 2. The synthesis can take place inside a vessel or a container (201). A suitable solution (202) for the reaction and NPL seeds (203) can be placed inside the container. NPL seed concentration may affect the lateral dimension of the mesoscale NPLs. Cd precursors or Hg precursors (204) can also be placed in the container. Chalcogen precursors (205) including (but not limited to) S precursors, Se precursors, and Te precursors, can be injected into the container at an injection rate. The injection rate can affect the size of the NPLs as well. A heat source (not shown) can be used to keep the reaction solution at an elevated temperature. A thermometer (206) can be used to monitor the reaction temperature. The reaction temperature can also affect the sizes of the synthesized mesoscale NPLs.

Figure 3:
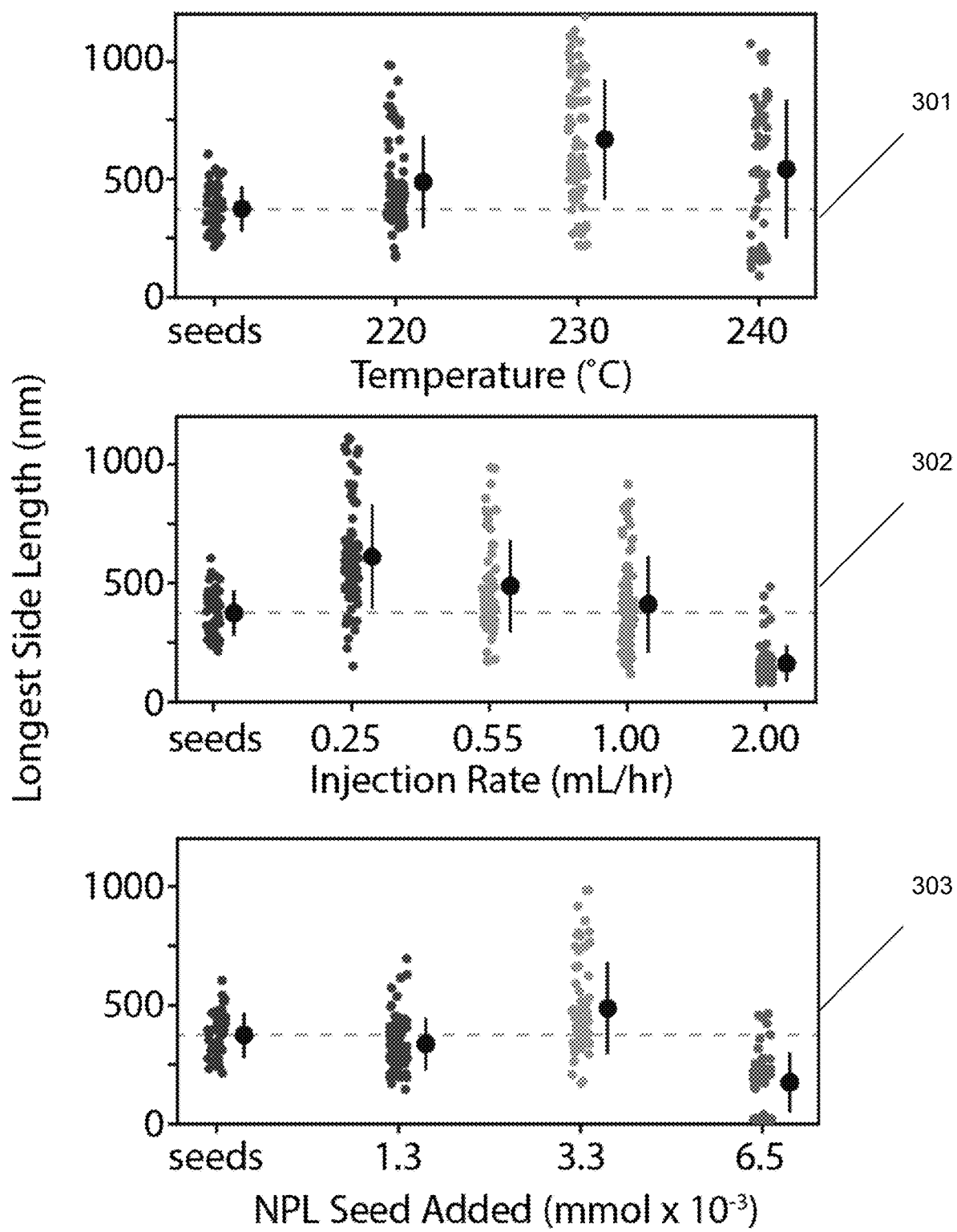
FIG. 3 illustrates longest side length of mesoscale NPLs at various synthesis parameters in accordance with embodiments.

Size distributions of the long edge of NPLs after seeded growth at different reaction condition in accordance with an embodiment of the invention is illustrated in FIG. 3. Size distribution of the NPL long edge at different reaction temperature (301) show that temperatures slightly elevated (from about 220° C. to about 230° C.) relative to the initial seed growth temperature (about 210° C.) can result in large extended NPLs and a broadening of the size distribution. At temperatures above 230° C., NPLs appear to be smaller than the seed NPLs nucleate during the growth. Size distribution at different injection rate (302) and at different NPL seed concentration (303) show that fast injection rates (from about 1 mL/hour to about 2 mL/hour) and high concentrations of seeds can be favorable for nucleating new, small NPLs. While slow injection rates (less than 0.55 mL/hour) and low concentrations may form large NPLs alongside 3D agglomerates. An optimal point between either extreme can be found to yield the largest NPLs. Solid circles represent the counts for each size distribution, while the solid lines show the mean and standard deviation of each condition explored. The dashed line represents the average size of the initial seeds.

Synthesis of Quantum Dot on Nanoplatelet Heterostructures

Many embodiments provide synthesis processes to grow QDs on NPLs to form heterostructures. In several embodiments, cation exchange and/or ligand exchange of two and three monolayer HgSe and HgTe NPLs can be employed to produce growth of emissive QD-like defects on the NPL surface. Such heterostructures in accordance with several embodiments can have a continuously tunable set of mid-gap states with a high degree of synthetic control over the wavelength of emission arising from the colloidal growth of the QD while maintaining high QY. In some embodiments, 3 ML HgTe can exhibit tuned narrowband emission from about 1000 nm to about 1500 nm with a FWHM of about 100 meV to about 200 meV and QY is greater than 30% across this range. In certain embodiments, emission linewidths can be slightly broader than highly monodisperse PbS QDs. In some embodiments, these properties can match the highly emissive PbX/InAs quantum dots without synthetic optimization. In several embodiments, the emission can be stable over several months. Many embodiments provide that kinetic conditions can influence its rate of evolution by correlating the exchange of ligand type to the formation and tunability of the SWIR emission. Several embodiments provide that the radiative lifetime can be significantly faster than PbX analogs. A number of embodiments provide that HgX NPLs can be substrates for tunable fluorescent applications including (but not limited to) lighting, imaging, and as materials for luminescent solar concentrators.

EXEMPLARY EMBODIMENTS

Although specific embodiments of systems and methods are discussed in the following sections, it will be understood that these embodiments are provided as exemplary and are not intended to be limiting.

Example 1: Synthesis of SWIR Emitting NPLs

Mercury chalcogenides (HgX) are a class of binary semiconductors with narrow or negative bandgaps used primarily in infrared photodetection. Like their cadmium chalcogenide analogs, quantum confined HgX (X can be S, Se, and/or Te) nanocrystals (NCs) can be synthesized with size-tuned bandgaps that vary from near zero to 1 eV. A few reports have shown high infrared quantum yields (QY) (See, e.g., Abdelazim, N. M, et al., *Chem. Mater,* 2017, 29, 6, the disclosure of which is herein incorporated by reference). HgX nanocrystals have not been extensively explored as compact fluorophores for the short or mid-wave infrared, unlike their PbX analogs. Many embodiments provide that ligand-exchanged two and three monolayer HgX nanoplatelets can have highly tunable emission in the SWIR while maintaining size-confined nanoplatelet absorption features.

Many embodiments implement ligand exchange of two and three monolayer HgSe and HgTe NPLs to produce growth of emissive QD-like defects on the NPL surface, similar to dot-on-platelet heterostructures. Such dot-on-platelet heterostructures can have a continuously tunable set of mid-gap states with a high degree of synthetic control over the wavelength of emission arising from the colloidal growth of the QD while maintaining high QY. In some embodiments, 3 ML HgTe can exhibit tuned narrowband emission from about 1000 nm to about 1500 nm with a FWHM of about 100 meV to about 200 meV and QY is greater than 30% across this range. In certain embodiments, emission linewidths can be slightly broader than highly monodisperse PbS QDs. In some embodiments, these properties can match the highly emissive PbX/InAs quantum dots without synthetic optimization. In several embodiments, the emission can be stable over several months. Many embodiments show kinetic conditions can influence its rate of evolution by correlating the exchange of ligand type to the formation and tunability of the SWIR emission. Several embodiments show that the radiative lifetime can be significantly faster than PbX analogs by using superconducting nanowire single photon detectors (SNSPDs) to obtain time-resolved band-edge and sub-band emission.

Figure 4B:
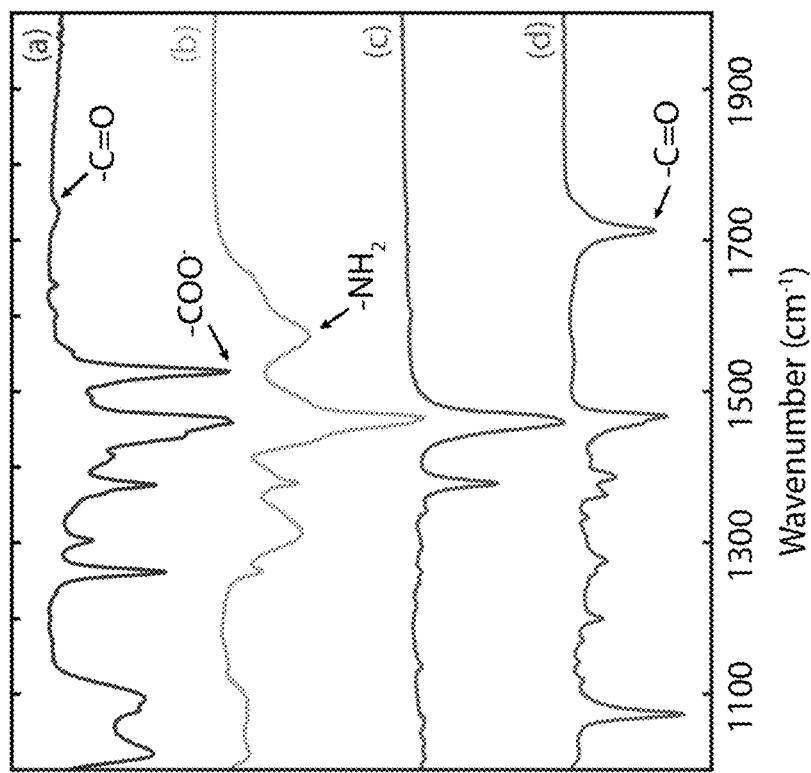
FIGS. 4A-4B illustrate FTIR spectroscopy of (a) 3 ML CdTe NPL before exchange, (b) 3 ML HgTe NPL immediately after exchange in oleylamine, (c) 3 ML HgTe NPL after deep mid-gap formation, and (d) 3 ML HgTe NPL obtained through exchange in triisobutylamine in accordance with embodiments.
Figure 4A:
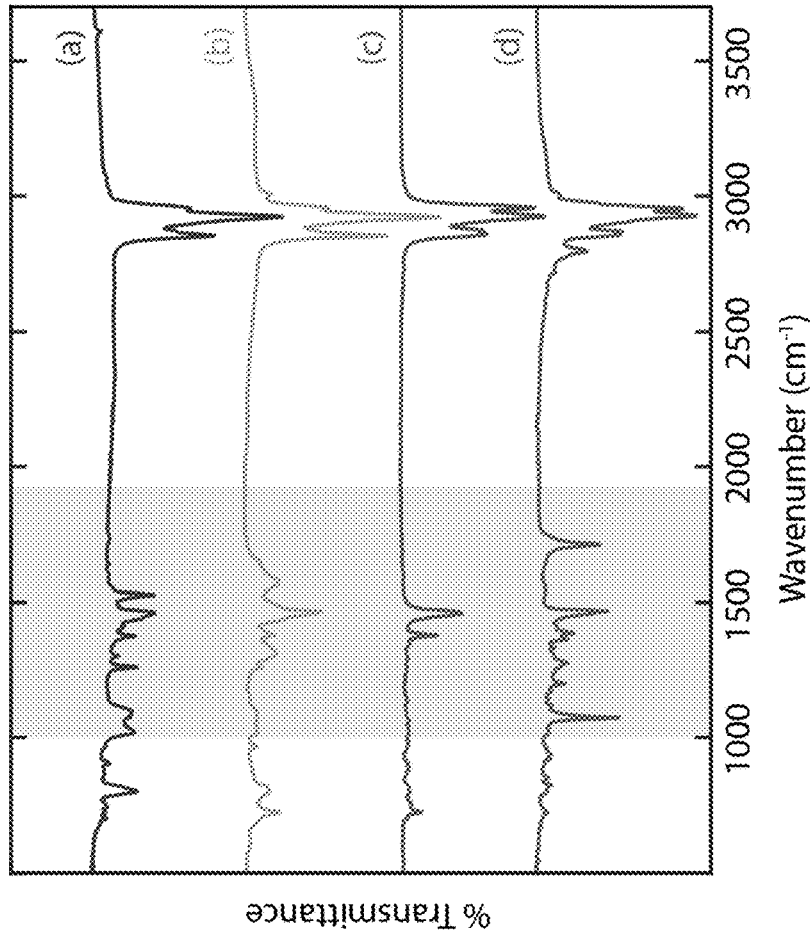

The synthesis of HgX NPLs can be based on the cation exchange procedures developed by Izquierdo et al. (See, e.g. Izquierdo, E., et. al, *J. Am. Chem. Soc.*, 2016, 138, 33, 10496-10501; Izquierdo, E., et. al, *Chem. Mater.*, 2018, 30, 12, 4065-4072; the disclosures of which are herein incorporated by reference). Many embodiments provide that II-VI NPLs including (but not limited to) 3 ML HgTe NPLs, 3 ML CdTe NPLs, can be first synthesized using slow injection of trioctylphosphine telluride to a degassed solution of cadmium propionate precursor and oleic acid in octadecene at about 215° C. Once the reaction is complete, the NPLs can be purified by precipitation and resuspended in hexanes in accordance to several embodiments. FTIR spectroscopy of CdTe and HgTe NPL from 500 $cm^{-1}$ to 3500 $cm^{-1}$ wavelength range in accordance with an embodiment of the invention is illustrated in FIG. 4A. A zoom in from 1100 $cm^{-1}$ to 1900 $cm^{-1}$ wavelength range of the FTIR spectroscopy of CdTe and HgTe NPL in FIG. 4A in accordance with an embodiment of the invention is illustrated in FIG. 4B. In FIG. 4A and FIG. 4B, (a) shows 3 ML CdTe NPL before exchange, (b) shows 3 ML HgTe NPL immediately after exchange in oleylamine, (c) shows 3 ML HgTe NPL after deep mid-gap formation, and (d) shows 3 ML HgTe NPL obtained through exchange in triisobutylamine. FTIR spectroscopy of the CdTe NPLs shows that they are passivated with acetate and/or oleate ligands after synthesis.

Figure 5:
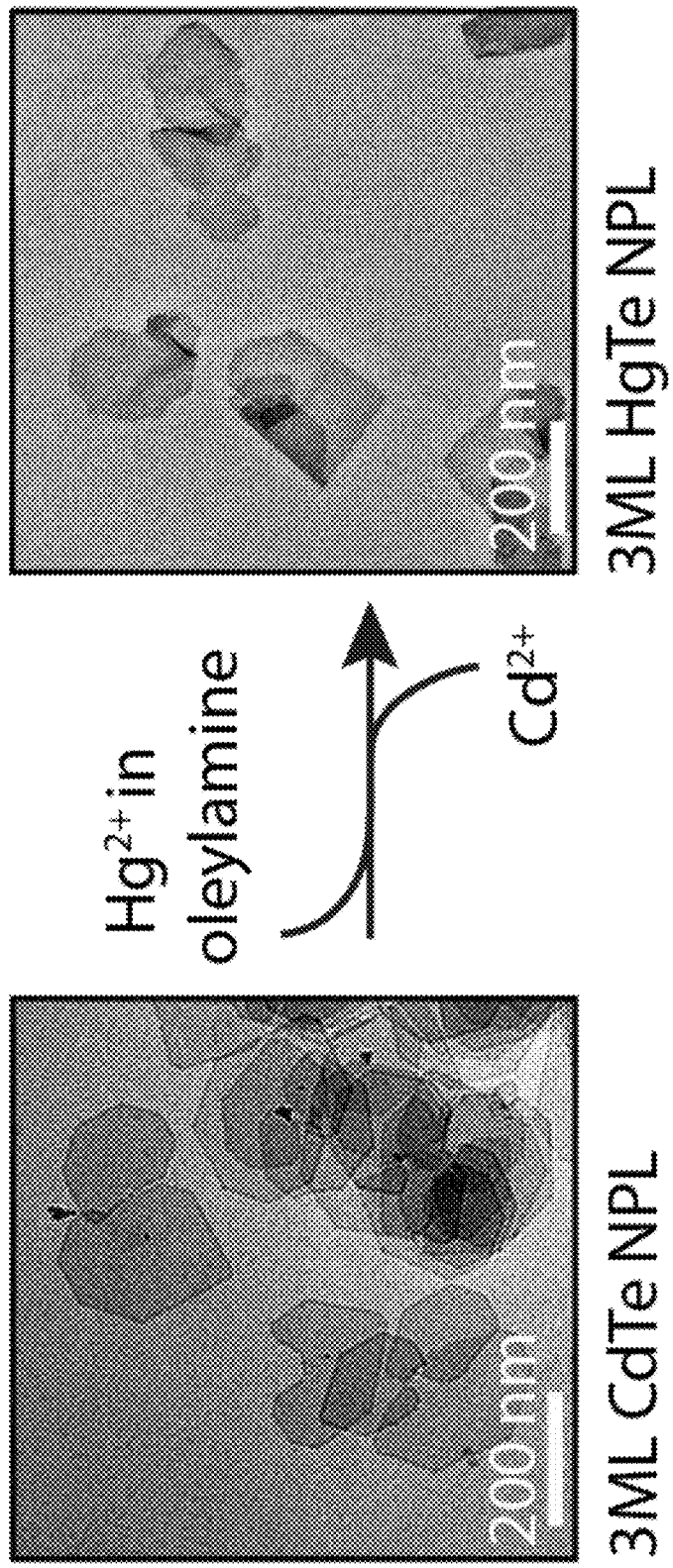
FIG. 5 illustrates mercury chalcogenide nanoplatelet morphology after exchange in transmission electron microscopy images in accordance with embodiments.

In some embodiments, mercury (II) acetate can be dissolved in oleylamine and introduced at room temperature (from about 20° C. to about 25° C.) to a solution of CdTe NPLs in hexanes (ranging from about 2.4 to about 16% v/v) to exchange to HgTe. Ligand exchange can be accompanied by cation exchange where acetate/oleate are exchanged for oleylamine (FIGS. 4A and 4B), and transmission electron microscopy confirms that the morphology of the NPL is maintained, as shown in FIG. 5. In many embodiments, a similar procedure may be used for the synthesis and exchange of CdSe to HgSe.

Figure 6B:
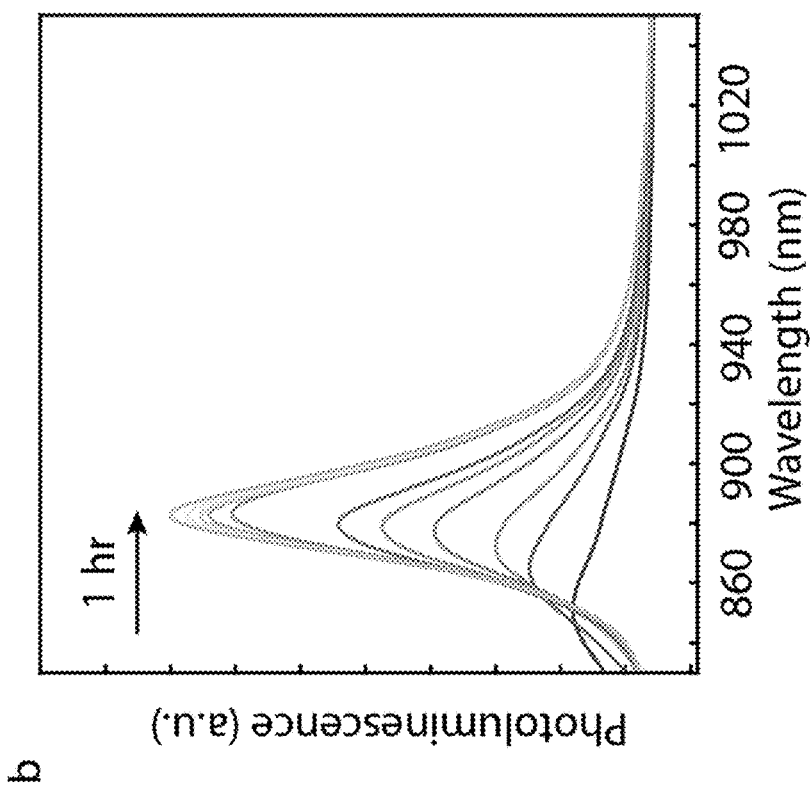
FIGS. 6A-6B illustrate in-situ absorbance and photoluminescence measurements used to monitor the progress of reaction in accordance with embodiments.
Figure 6A:
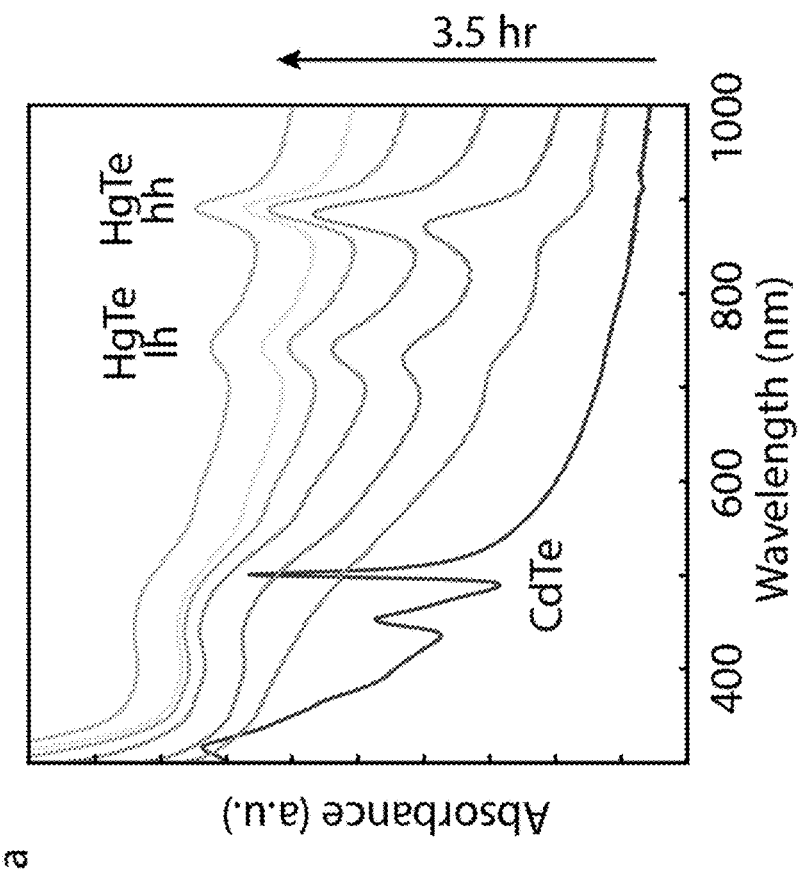

Many embodiments can monitor the progress of the cation exchange using absorbance and photoluminescence (PL). Spectra of in-situ absorbance and photoluminescence measurements used to monitor the progress of the reaction in accordance with an embodiment of the invention is illustrated in FIG. 6A and FIG. 6B. After the disappearance of the CdTe excitonic features in the absorption spectrum, the HgTe features appear and gradually redshift towards the band-edge (hh) of 880 nm as shown in FIG. 6A. In FIG. 6B, photoluminescence shows that during formation the emission shifts from 850 nm to about 900 nm and narrows to a FWHM of about 40 nm.

Figure 7:
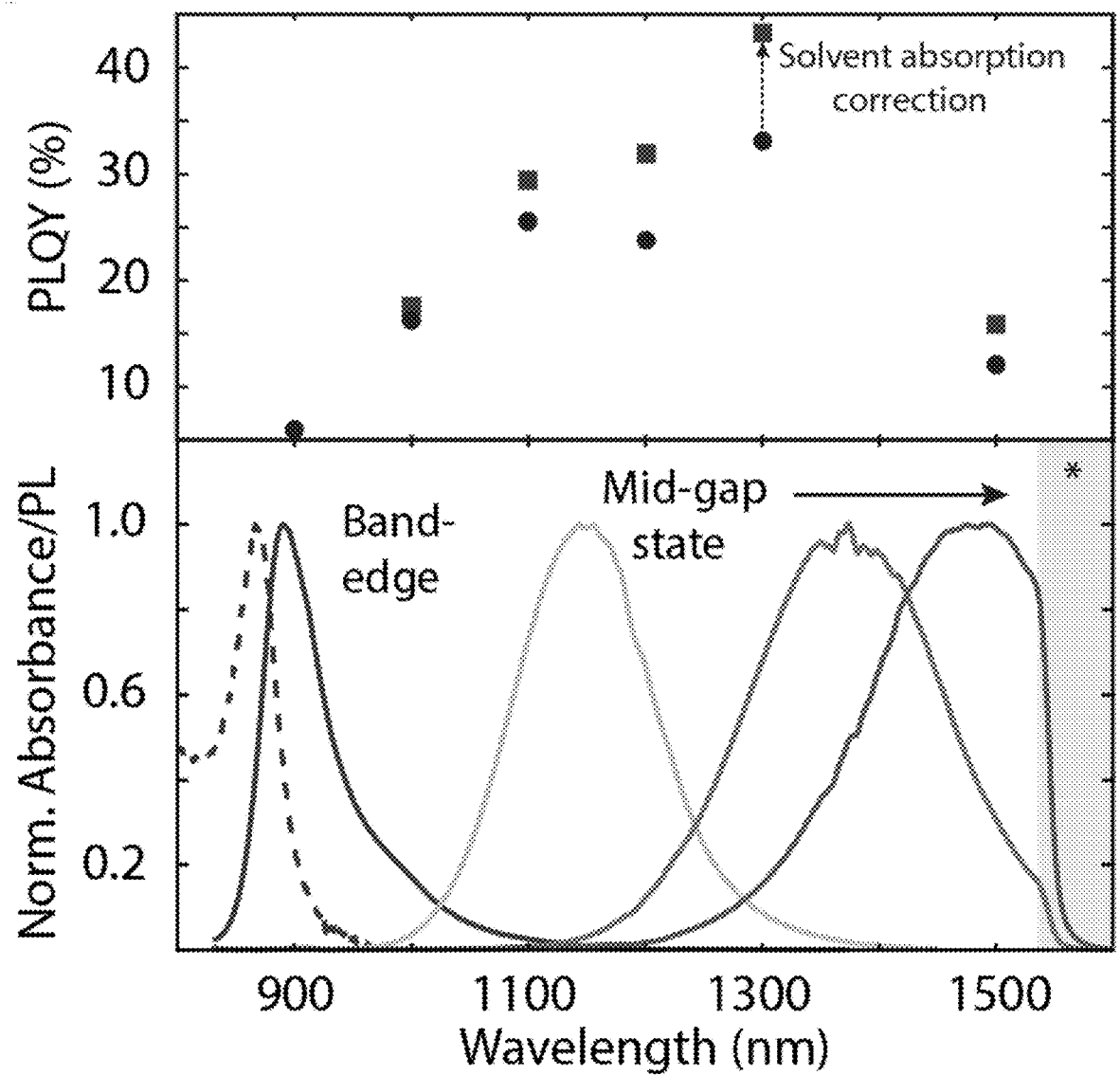
FIG. 7 illustrates the absorption and photoluminescence of HgTe nanoplatelet in accordance with embodiments.

Unlike previously reported NPL cation exchanges, when PL is monitored several hours after exchange, a bright Stokes-shifted emission (from about 1000 nm to about 1100 nm) appears along with band-edge emission in accordance with some embodiments. The new emissive state in certain embodiments can shift further into the infrared as a function of time while the band edge emission quenches. The absorption and photoluminescence of 3M HgTe NPL in accordance with an embodiment is illustrated in FIG. 7. In FIG. 7, the absorption (dashed line) and PL (solid lines) of 3 ML HgTe NPL show band-edge emission after synthesis, and mid-gap emission which appears and red-shifts over the following days. QY for these states are from about 25% to about 35%. The PL spectra are corrected for solvent absorption to better visualize position and width. Despite large continual changes in observed emission, features in the absorption spectrum do not proportionally shift. Many embodiments show that the PL line-width of the red-shifted emission is approximately from about 200 nm to about 300 nm. FIG. 7 shows that the PL quantum yield (QY) remains centered around 30%.

Figure 8:
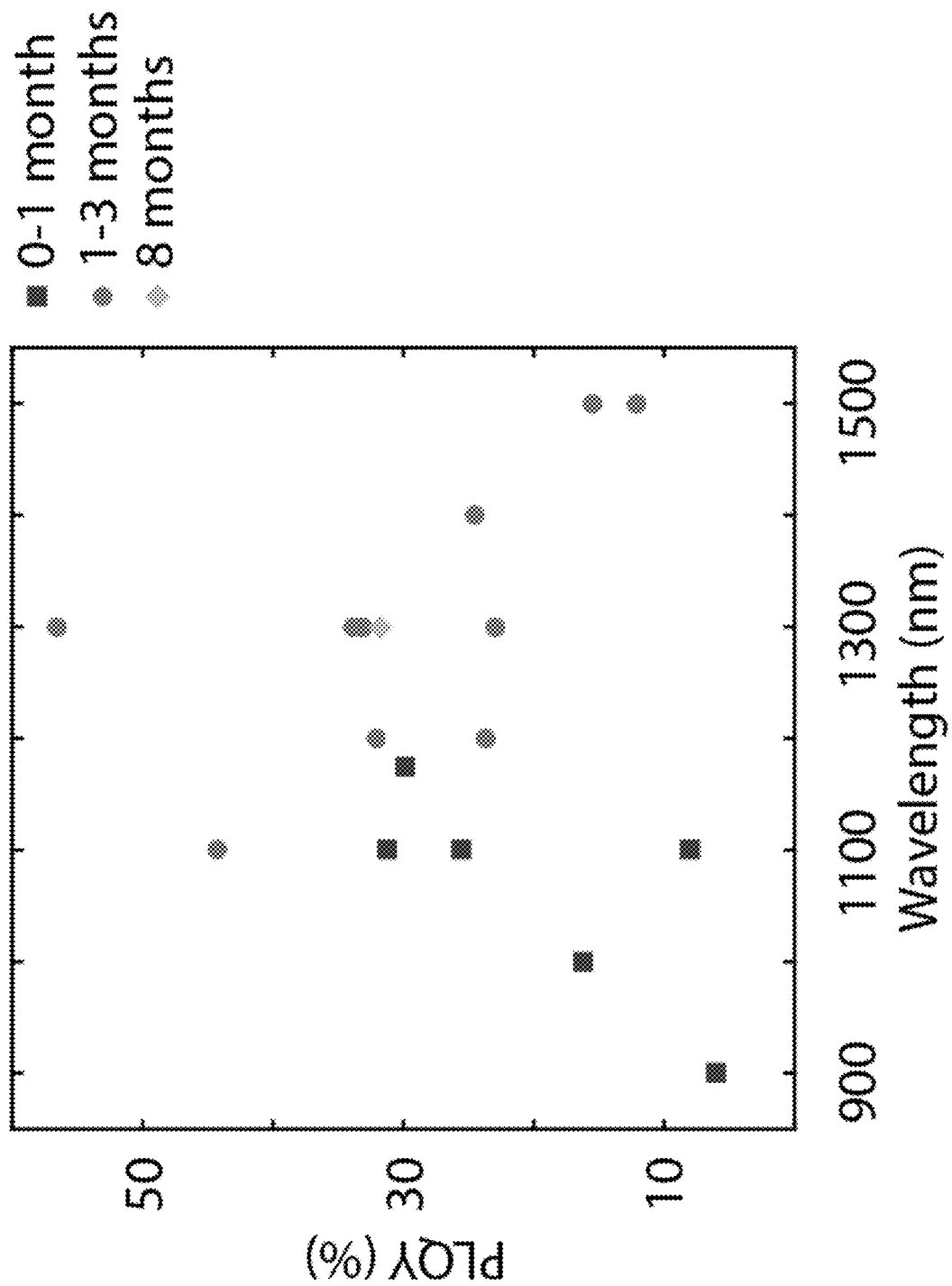
FIG. 8 illustrates the measured absolute photoluminescence quantum yields (PLQY) of various samples of HgTe NPLs showing band edge (900 nm) emission and mid-gap (1000+ nm) emission in accordance with embodiments.

In many embodiments, the high QY can be consistent across a number of different samples. In several embodiments, the high QY can be stable over an extended period of time. In some embodiments, the absolute QY measured across different wavelengths can have values between about 10% to about 56%. The measured absolute photoluminescence quantum yields (PLQY) of various samples of HgTe NPLs showing band edge (900 nm) emission and mid-gap (1000+ nm) emission in accordance with an embodiment is illustrated in FIG. 8. In FIG. 8, HgTe NPL quantum yields (PLQY) are between about 25% and about 35%, and can reach up to about 56%. QY remains high even in NPL aged up to 8 months. The values in FIG. 8 are not corrected for solvent reabsorption, and yields would be likely higher when considering solvent reabsorption correction.

In a number of embodiments, systematic error can be explored using relative QY determination with a SWIR emitting dye standard giving a consistent value of about 18%. Absorbance of HgTe and Flav7 dye, and the relative quantum yield determination of HgTe NPLs in accordance with an embodiment is illustrated in FIGS. 9A-9C. FIG. 9A illustrates the absorbance and PL of Flav7. FIG. 9B illustrates the absorbance and PL of HgTe NPLs. FIG. 9C illustrates the integrated PL intensity of the diluted solutions and their fit lines (dashed lines) used to determine the relative quantum yield. An absolute quantum yield of the same HgTe NPL sample using an integrating sphere can be determined to be about 25.6%. While the relative quantum yield may not be entirely optimized considering the difference in solvent between the two samples (DCM vs. hexanes) and non-linearity of the HgTe, this value provides an estimate about the magnitude of QY for the HgTe NPLs. The QY values in accordance with several embodiments do not account for losses due to solvent reabsorption. Several embodiments may apply a correction to QY for the reabsorption of hexanes in FIG. 7. Many embodiments show long-term stability of the emissive species. After aging for 8 months, NPLs can retain QY up to about 32% in accordance with some embodiments.

Figure 10:
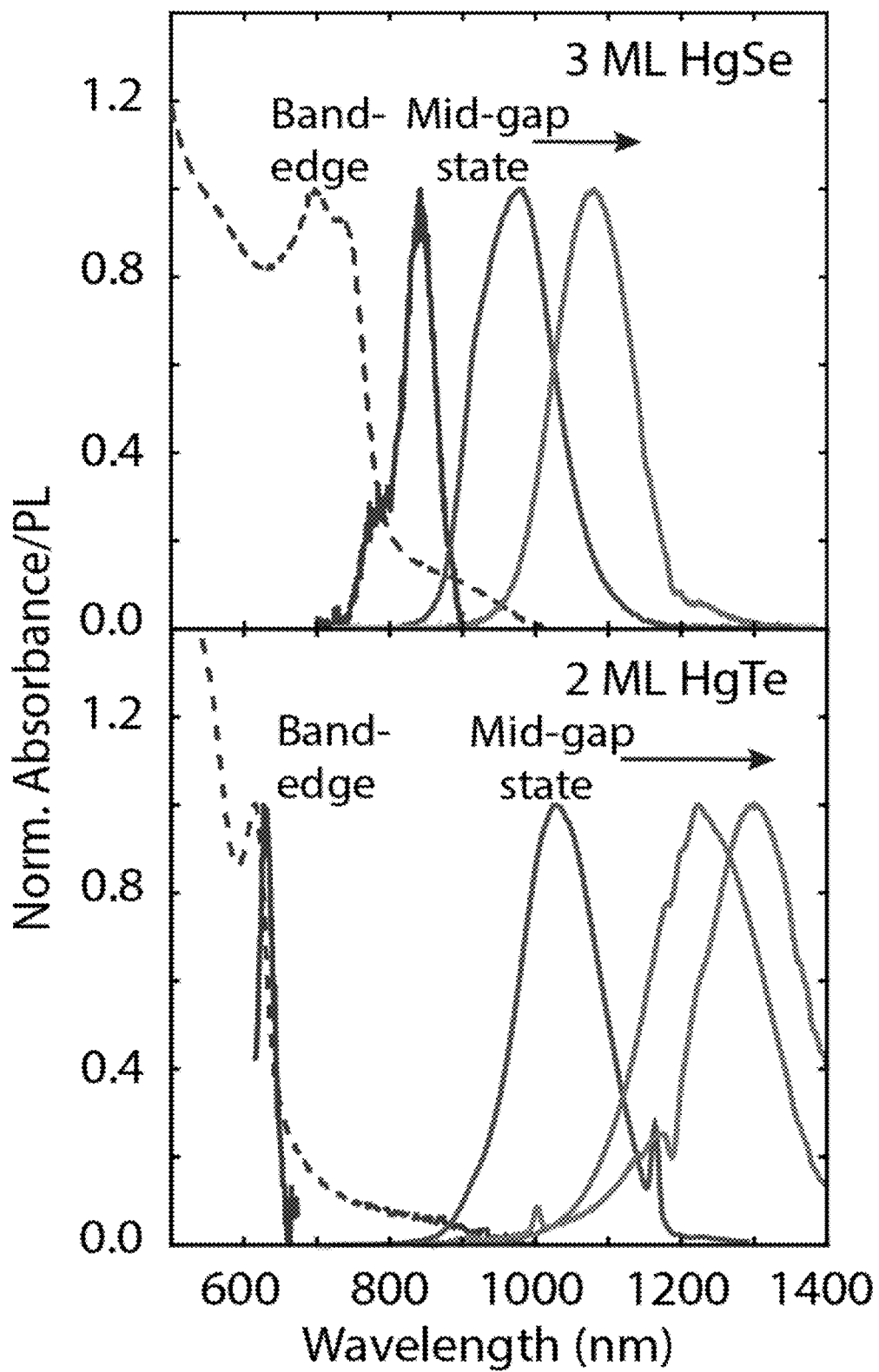
FIG. 10 illustrates cation exchange in HgSe and HgTe in accordance with embodiments.

In many embodiments, the long-term stability of the emissive species can occur and extend to systems of HgX NPLs such as HgSe and 2 ML HgTe, given the appropriate set of synthetic conditions. Several embodiments provide that the mechanism of bright mid-gap state evolution may be applicable to other materials. FIG. 10 shows cation exchange in 3 ML HgSe and 2 ML HgTe show similar behavior as 3 ML HgTe.

Several embodiments provide synthesis processes for precursors. For cadmium Propionate (Cd(prop)$_2$). 1.036 g of CdO powder can be mixed with 10 mL propionic acid under Ar flow for 1 hour. The flask can then be opened to atmosphere and heated at about 140° C. until the volume is reduced to half. The white solution can be precipitated with acetone and centrifuged. The supernatant is discarded, and the solid is dried and stored in a vacuum desiccator.

For 1M TOP-X (X=Se, Te) precursors, in a small flask, 5 mmol of X powder and 2 mL of tri-n-octylphosphine are degassed under vacuum at room temperature. Then, under Ar flow, the solution can be stirred (at room temperature for TOP-Se, or at 275° C. for TOP-Te) until the dissolution is complete.

For 10 mM mercury acetate (Hg(OAc)$_2$) precursors, in a small vial, 9.2 mg of mercury (II) acetate and 3 mL of oleylamine are stirred at room temperature until dissolved. The same procedure can be repeated with triisobutylamine solution. For concentrations less than 10 mM, solutions are diluted from a 10 mM stock solution with oleylamine and stirred at room temperature. For concentrations greater than 10 mM, solutions are individually made and sonicated at 35° C. for 20 min to dissolve all of the salt.

Some embodiments provide nanoplatelet synthesis processes. For 3 ML CdSe NPL, in a three-neck flask, 240 mg of Cd(OAc)$_2$.2H2O, 0.150 mL of oleic acid and 15 mL of octadecene (ODE) are degassed under vacuum at about 80° C. for 1 hour. Under Ar flow, the solution can then be heated to about 195° C. and 0.4 mL of 1M TOP-Se mixed with 3.75 mL ODE can be injected with a syringe pump at a rate of 5 mL/hr. The solution is then cooled and the NPLs can be precipitated with ethanol, centrifuged, and resuspended in 20 mL of hexanes. Assuming that 0.4 mmol of Se has reacted, an approximate final concentration of 26 mM Cd in the NPLs can be obtained.

For synthesis of 3 ML CdTe NPL, in a three-neck flask, 260 mg of Cd(prop)$_2$, 0.160 mL of oleic acid and 20 mL of octadecene are degassed under vacuum at about 90° C. for 1 hour. Under Ar flow, the solution can be then heated to about 210° C. and 0.200 mL of 1M TOP-Te mixed with 3.75 mL of octadecene is injected with a syringe pump at a rate of 5 mL/hr. The solution is then cooled and 0.500 mL of oleic acid is injected. The NPLs are precipitated with ethanol and centrifuged at about 14000 rpm for about 5 min, followed by resuspension in 20 mL hexanes. Assuming that the 0.2 mmol of Te has reacted, an approximate final concentration of 13 mM Cd in the NPLs can be obtained.

For synthesis of 2 ML CdTe NPL, in a 3 neck flask, 130 mg of Cd(prop)$_2$, 0.080 mL oleic acid, and 10 mL of octadecene are degassed at about 90° C. for 1 hour. Under Ar flow, the solution is then heated to about 180° C. When the temperature is reached, 0.100 mL of 1M TOP-Te mixed with 0.500 mL octadecene are swiftly injected. After 20 min, the reaction is cooled to room temperature and 1 mL of oleic acid is injected. The NPLs can be precipitated with ethanol and centrifuged at 14000 rpm for 5 min, followed by resuspension in 10 mL hexanes.

For cation exchange from CdX to HgX NPL (X=Te, Se), in a round-bottom flask, 0.240 mL of 6 mM CdX NPL and 6 mL of hexanes are mixed. Then, 0.300 mL of 10 mM Hg(OAc)$_2$ in oleylamine can be added and stirred at room temperature. This can result in a 1:2 (Cd:Hg) ratio where Hg$^{2+}$ is added in excess. The reaction can be considered complete when the absorption of the hh exceeds that of the 1 h (typically 3-4 hr). The NPLs can then be centrifuged at 14000 rpm for 5 minutes and resuspended in 5 mL hexanes. Samples that do not undergo the washing procedure experience the same mid-gap formation and evolution, however at a different rate. For cation exchange in triisobutlyamine, the procedure can be repeated for exchange from CdTe to HgTe NPL using 10 mM Hg(OAc)$_2$ in triisobutylamine.

Example 2: Synthesis of Mesoscale NPLs

Many embodiments provide seeded growth processes for mesoscale II-VI NPLs. Several embodiments provide 2 ML and 3 ML II-VI seeds including (but not limited to) CdTe seeds with an average lateral extent of 93 and 367 nm respectively for growing mesoscale NPLs. In some embodiments, 2 ML CdTe NPLs can be synthesized by a swift injection of TOP-Te to cadmium propionate at about 180° C. For 3 ML NPLs, certain embodiments employ a slow injection method, where TOP-Te can be continuously injected into a degassed solution of cadmium propionate at about 210° C. The NPL products can then be centrifuged and resuspended in fresh solvent. Several embodiments use the NPLs as seeds and extend the lateral sizes from about 1000 nm to about 1500 nm by reintroducing them to new precursor with a second, slower injection and carefully controlled rate of growth. Despite the change in size, the larger NPLS can retain their absorption and emission profiles after this seeded growth process in accordance with many embodiments. In a number of embodiments, slow seeded growth processes may facilitate NPL seeds to reach larger than 1 micron in sizes. Some embodiments provide that using slow injection without seeds or fast injection with seeds may not produce NPLs larger than about 500 nm.

Figure 11B:
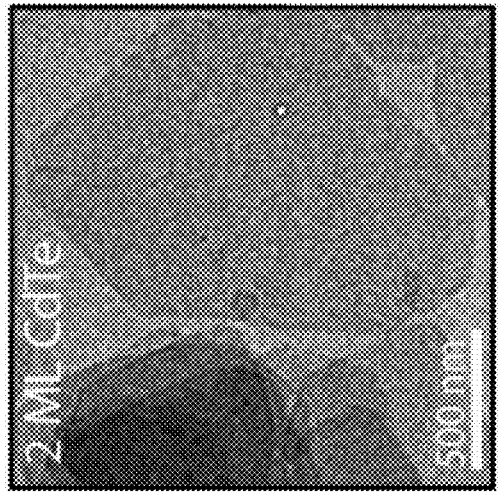
FIGS. 11A-11D illustrate transmission electron microscopy (TEM) of 2 and 3 ML CdTe NPL seeds before and after seeded growth in accordance with embodiments.
Figure 11D:
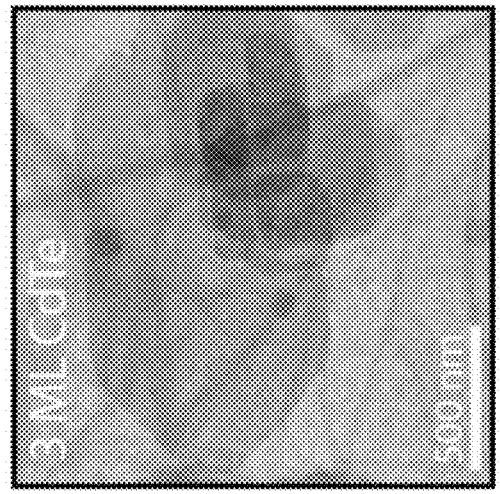
Figure 11A:
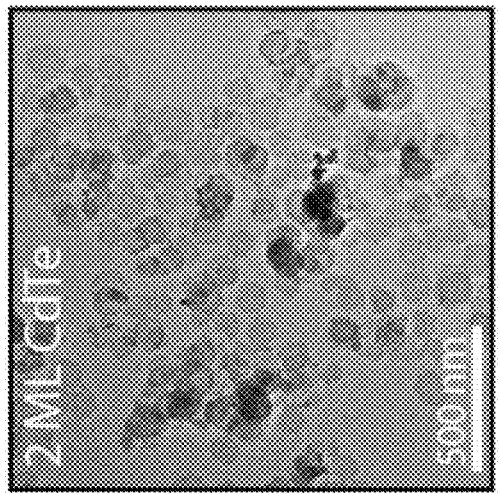
Figure 11C:
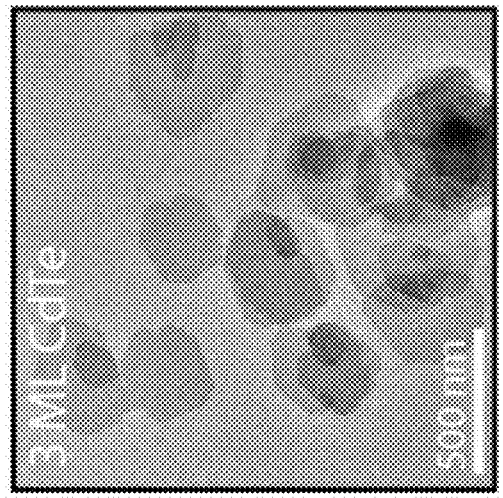

TEM images of 2 ML and 3 ML CdTe NPL seeds before and after seeded growth in accordance with an embodiment of the invention is illustrated in FIG. 11A-11D. FIG. 11A illustrates 2 ML CdTe seeds. FIG. 11B illustrates 2 ML CdTe after seeded growth. FIG. 11C illustrates 3 ML CdTe seeds. FIG. 11D illustrates 3 ML CdTe after seeded growth.

Figure 12:
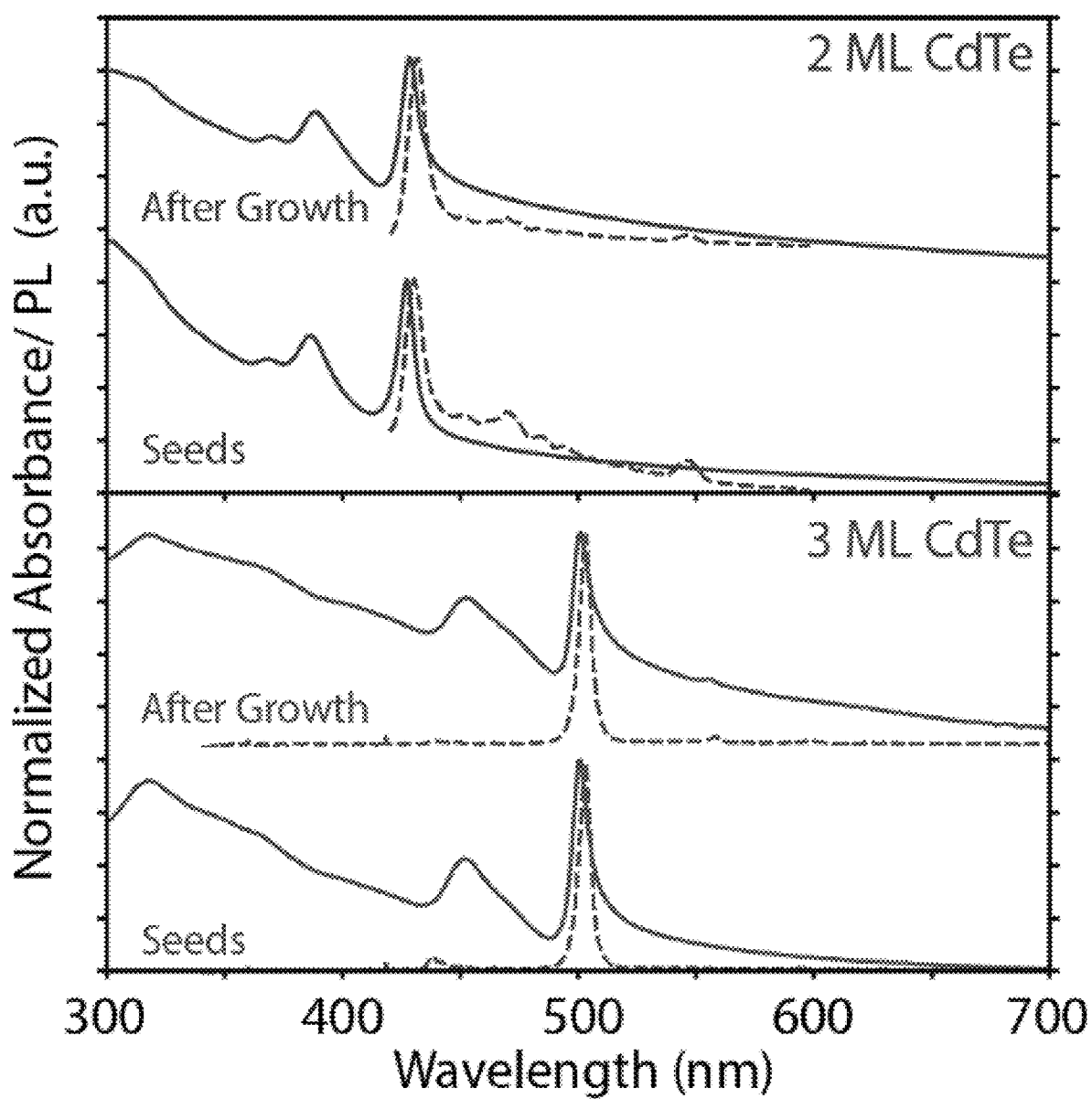
FIG. 12 illustrates absorption and photoluminescence spectra before and after seeded growth in accordance with embodiments.

Absorption (solid lines) and photoluminescence (PL, dashed lines) spectra of 2 ML and 3 ML CdTe NPL seeds before and after seeded growth in accordance with an embodiment of the invention is illustrated in FIG. 12. The absorption and PL for 2 ML CdTe almost overlap for the NPL seeds and the seeds after growth. The absorption and PL for 3 ML CdTe almost overlap for the NPL seeds and the seeds after growth.

Figure 13:
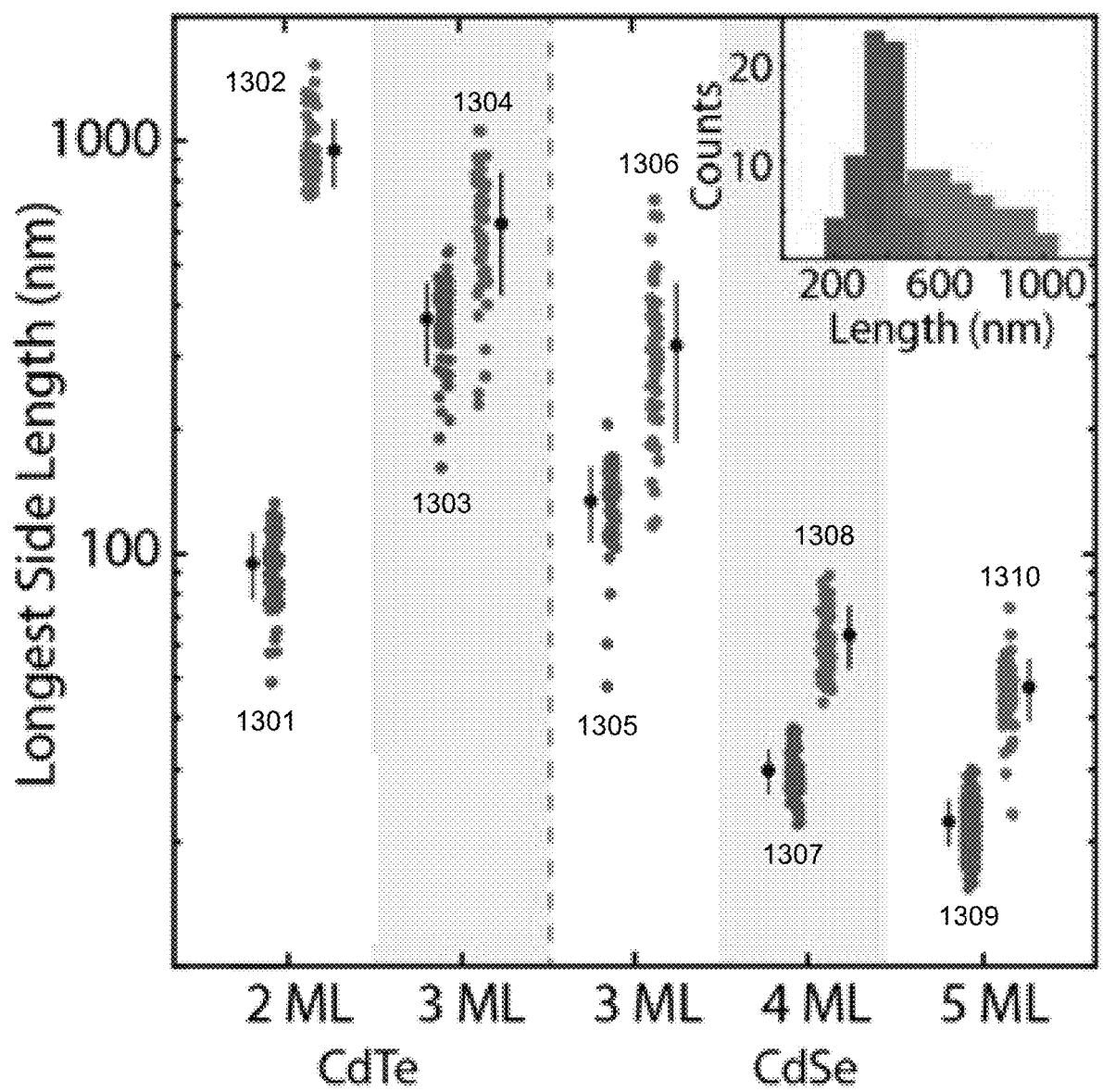
FIG. 13 illustrates the difference in size before and after seeded growth for various CdX NPL thicknesses in accordance with embodiments.

Several embodiments provide lateral dimension changes of mesoscale NPLs. Some embodiments provide the change in lateral extent for both CdTe NPLs (2-3 ML) and CdSe NPLs (3-5 ML) after applying the seeded growth processes. A larger enhancement can be observed in CdTe NPLs, but both CdTe and CdSe show a statistically significant change of at least twice the mean size while maintaining their absorption and emission. Change in lateral sizes of seeds and after seeded growth for CdTe and CdSe in accordance with an embodiment is illustrated in FIG. 13. 2 ML CdTe seeds (1301) and after seeded growth (1302), 3 ML CdTe seeds (1303) and after seeded growth (1304), 3 ML CdSe seeds (1305) and after seeded growth (1306), 4 ML CdSe seeds (1307) and after seeded growth (1308), and 5 ML CdSe seeds (1309) and after seeded growth (1310) are illustrated. The difference in size before (1301, 1303, 1305, 1307, and 1309) and after (1302, 1304, 1306, 1308, and 1310) seeded growth for various CdTe and CdSe NPL thicknesses are shown. Solid circles represent the counts for each size distribution, while the solid lines show the mean and standard deviation of each condition explored. Inset shows the full histogram of sizes before and after seeded growth for 3 ML CdTe.

Figure 14:
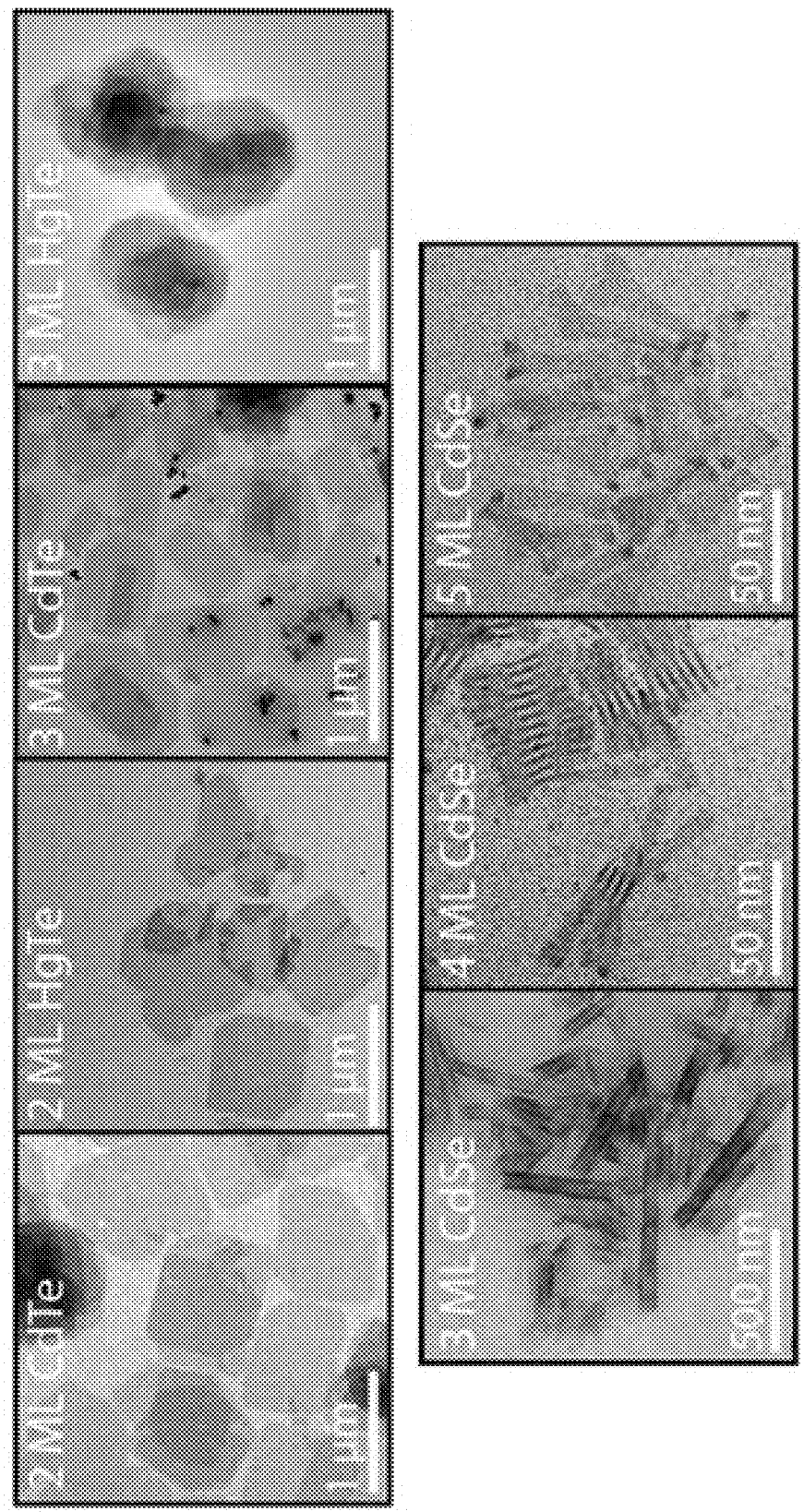
FIG. 14 illustrates TEM images of various NPLs after seeded growth in accordance with embodiments.

Certain embodiments provide that the synthetic procedures for CdSe seeds are different in that they may involve fast injections and as such, they have different aspect ratios as well as slightly different surface properties than CdTe NPLs. In some embodiments, small rectangular seeds (4 ML and 5 ML CdSe) can be seen and the tendency to curl under strain (3 ML CdSe). TEM images of NPLs after seeded growth, including CdTe NPLs, CdSe NPLs, and HgTe NPLs from cation exchange with large CdTe in accordance with an embodiment is illustrated in FIG. 14. Large 2 and 3 ML CdTe are isolated after seeded growth and introduced to a solution of mercury acetate and oleylamine at room temperature to yield the large HgTe NPLs. This shows that large CdTe NPLs are robust enough to undergo a complete cation exchange while maintaining their morphology, giving access to large area SWIR-emissive NPLs as well.

Figure 15A:
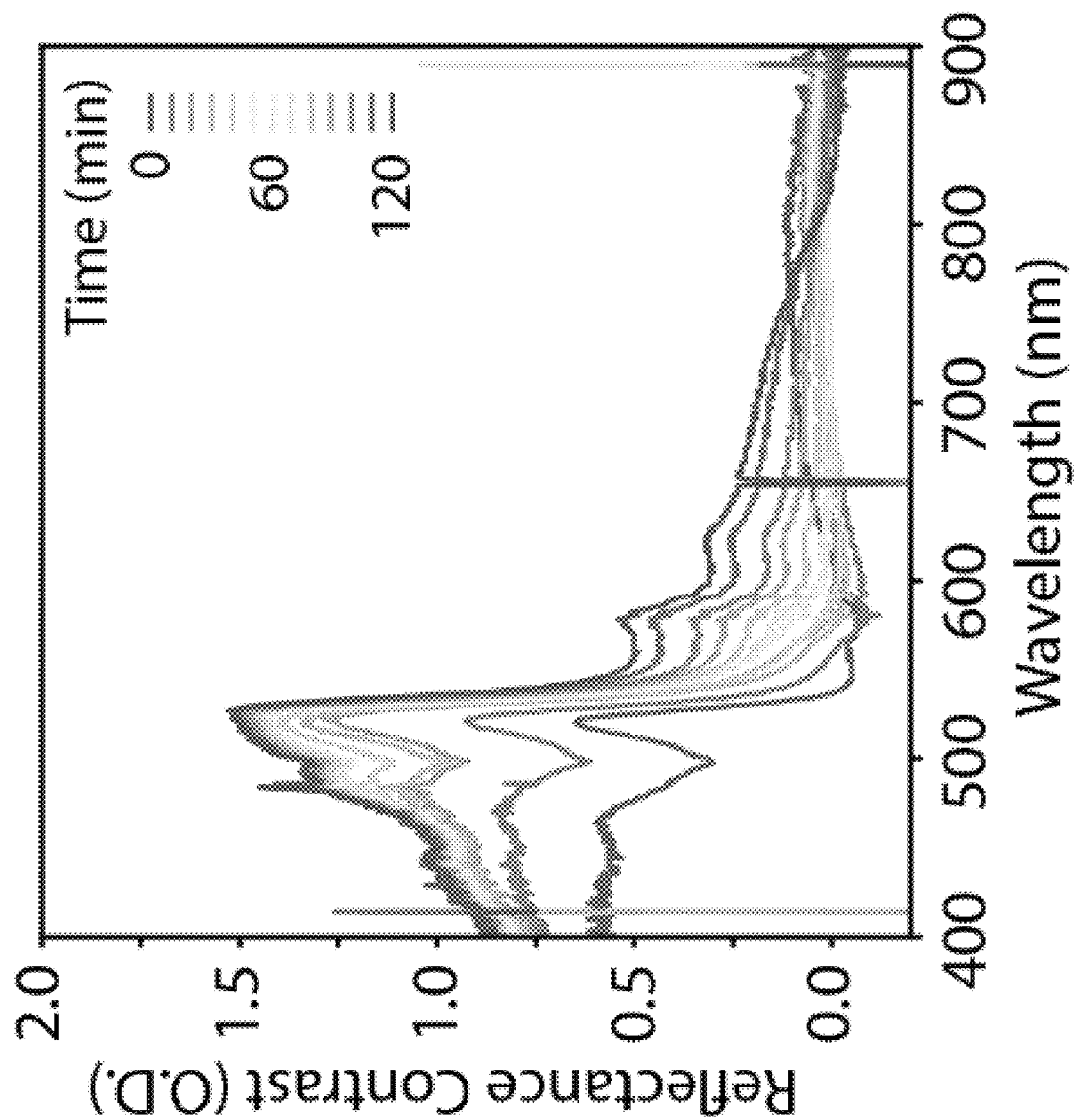
FIG. 15A illustrates optical density at various growth time during the seeded growth process in accordance with embodiments.

Several embodiments provide in-situ and ex-situ spectroscopy spectrum to show the dynamics of the seeded growth processes. Some embodiments implement reflectance probes to monitor changes in optical density (O.D.) to track changes in the excitonic features as well as the scatter profile. Reflectance contrast of a 2 hour seeded growth process in accordance with an embodiment is illustrated in FIG. 15A. Two major growth periods in the slope of the excitonic features can be observed—a rapid initial increase from about 0 min to about 20 mins, and another smaller increase from about 30 mins to about 45 mins. Beyond this point growth is slow and continual.

While the light hole (lh) and heavy hole (hh) alone may not give insight onto whether the new CdTe unit cells are added onto existing seeds or new secondary NPLs, the scatter profile shows more emphasized oscillatory behavior. TEM images of NPLs may show the changes in these features more clearly. The growth of some species around 550 nm and 650 nm may become visible after 60 minutes, but they may not be observed in absorption or PL of the isolated product after quenching and centrifugation. These may be thicker NPLs grown through ripening, but they appear to maintain a relatively low concentration compared to the 3 ML NPLs and may be small enough to be washed away during centrifugation.

Figure 15B:
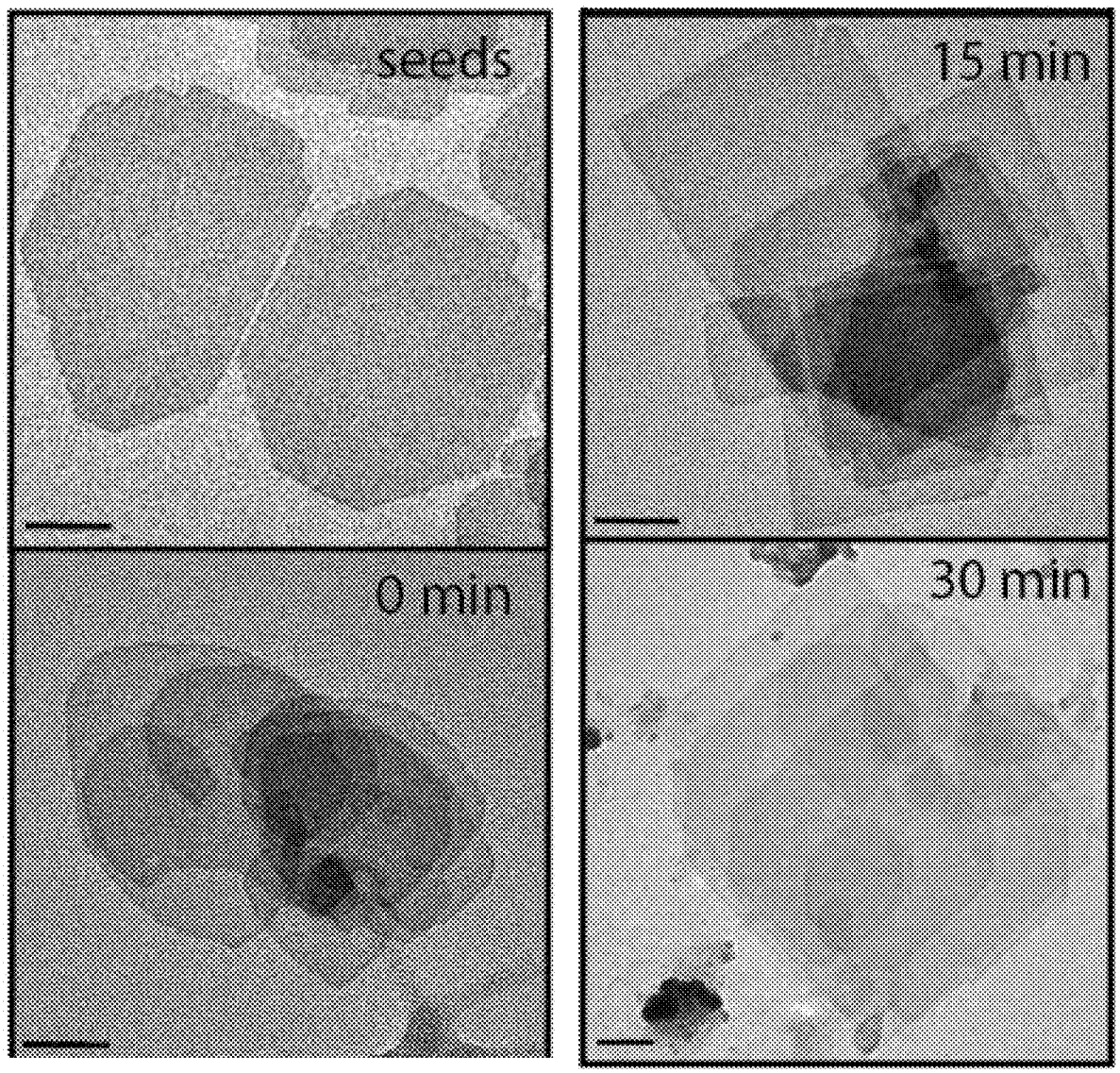
FIG. 15B illustrates TEM images of changes in features during the seeded growth process in accordance with embodiments.

In order to understand the morphological changes in the NPLs during seeded growth, certain embodiments use TEM and dynamic light scattering (DLS) to track the populations of seeds and secondary NPLs during the growth. TEM images of NPLs taken at seeds, 0 minute, 15 minutes after growth, and 30 minutes after growth in accordance with an embodiment is illustrated in FIG. 15B. FIG. 15B shows TEM of the largest platelets during the early stages of growth. Before any TOP-Te has been injected (time 0), there is a slight dissolution around the edges of the NPLs, which can explain the very slight loss of OD during the first few minutes. Once the injection has begun, however, the edges fill out and become rectangular. At about 30 mins, secondary nucleation starts to occur alongside a noticeable extension in the larger NPLs. This extension may not appear continuous during the remaining 30 minutes—a nucleation burst of many small NPLs may be noticeable by 45 mins, and only after that burst are the largest NPLs which reach about 1 micron visible (60 min).

Figure 15C:
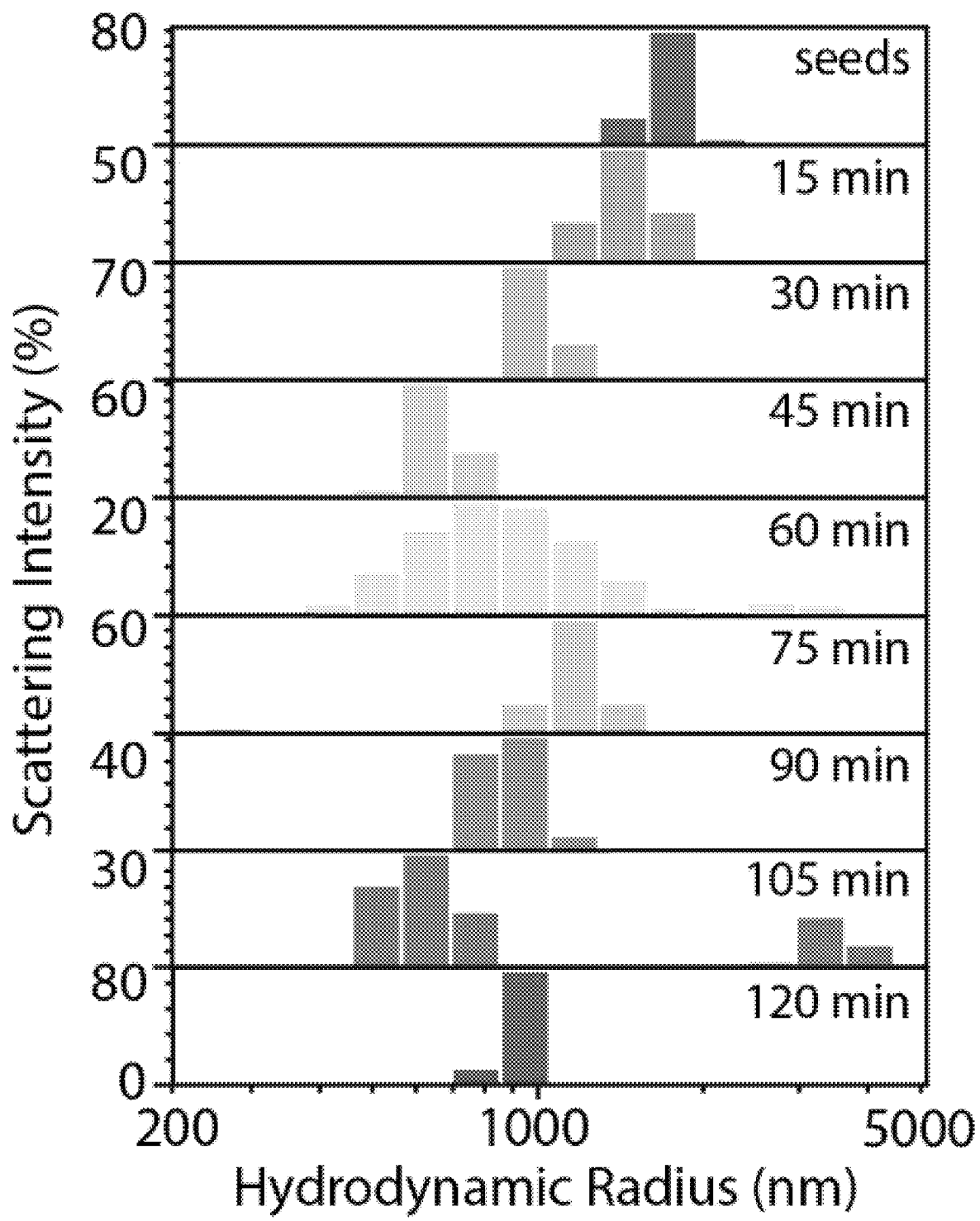
FIG. 15C illustrates scattering density at various growth time during the seeded growth process in accordance with embodiments.

To get a statistical measure of NPL behavior, some embodiments use DLS to show how the total population, small and large, may be evolving. The hydrodynamic radius can be derived for a spherical particle and may not reflect the absolute size of the NPLs, but it can give a relative measurement that avoids counting bias and includes information about the secondary nucleation. DLS of NPLs taken at seeds, 15 minutes after growth, 30 minutes after growth, 45 minutes after growth, 60 minutes after growth, 75 minutes after growth, 90 minutes after growth, 105 minutes after growth, and 120 minutes after growth in accordance with an embodiment is illustrated in FIG. 15C. FIG. 15C shows that from 0-45 min, the overall population distribution is decreasing in size, which may be due to the nucleation of secondary small NPLs. At about 60 mins, there is some scattering from larger particles, which coincides with the appearance of the 1 micron NPLs. Continuing the growth beyond an hour continues with another nucleation burst of smaller NPLs, but it seems that the large NPLs may have reached a maximum size between about 1000 nm and about 1500 nm. The small secondary NPLs appear to become stable and large enough to extend themselves and reach about 500 nm.

Many embodiments provide that the mesoscale single NPL structures can be observed under conventional light and fluorescence microscopy. Several embodiments provide procedures for correlative light and electron microscopy. Large NPLs can be first diluted and drop-cast onto a TEM grid with an alpha numerical reference pattern. The grid can then be sealed onto a microscope slide under inert air, and the photoluminescence can be imaged using an inverted confocal microscope equipped with cameras. Lifetimes can be collected on isolated spots that appear to be away from large clumps. Once these measurements are collected, the grid can be removed from the microscope slide, and imaged using TEM. The NPLs are large enough that the features in the PL are easily identifiable under TEM, and the exact NPLs can be imaged to confirm whether they are in fact isolated or within a stack.

Figure 16A:
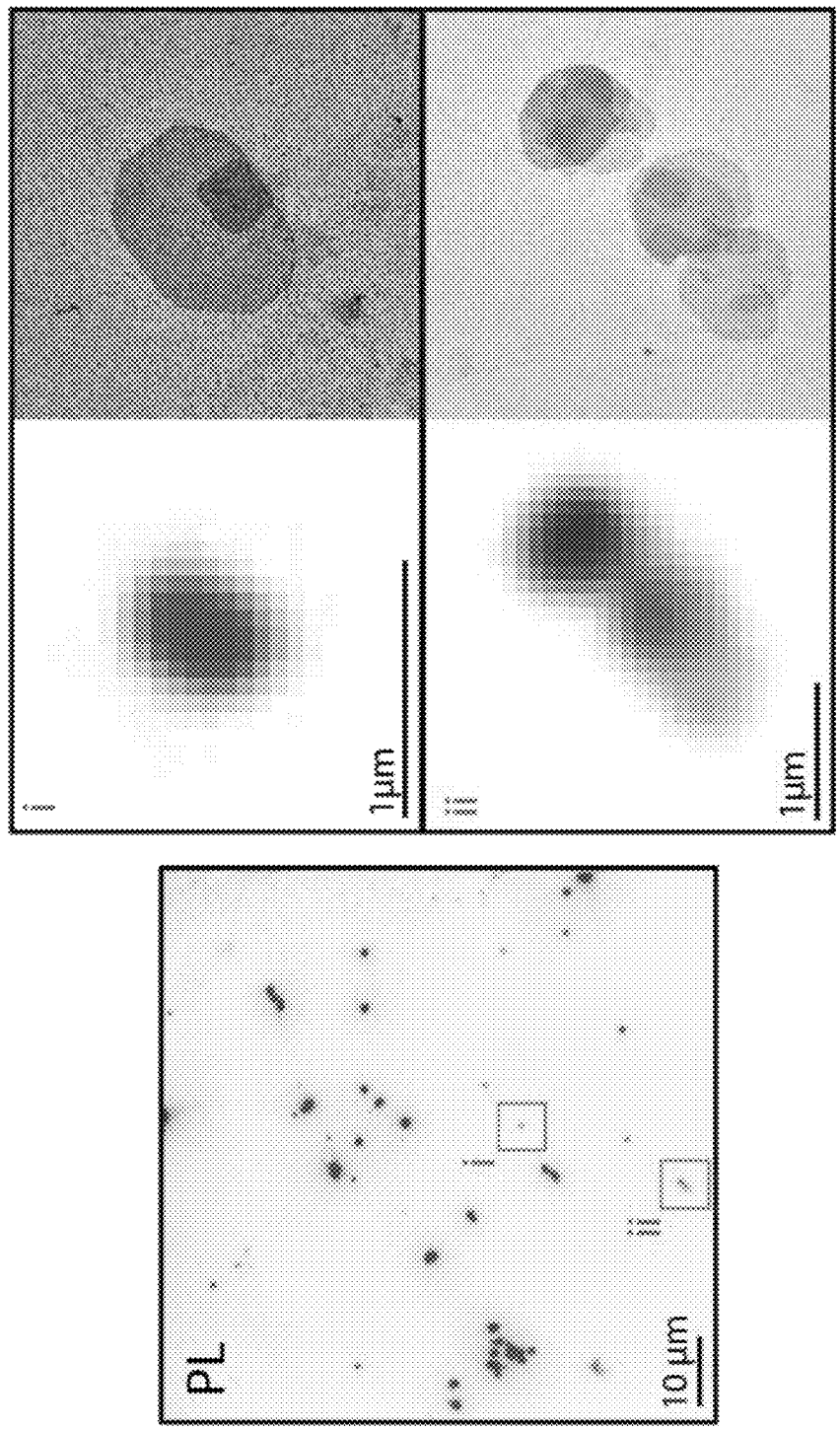
FIG. 16A illustrates photoluminescence of NPLs imaged under a microscope in accordance with embodiments.

Photoluminescence (PL) for a square within the grid, along with closeups (i and ii) correlated to TEM in accordance with an embodiment is illustrated in FIG. 16A. Since the NPL lateral extent is larger than the wavelength used to excite them (405 nm), it may not be within the diffraction limit of the microscope and is able to resolve the entire NPL structure.

Figure 16B:
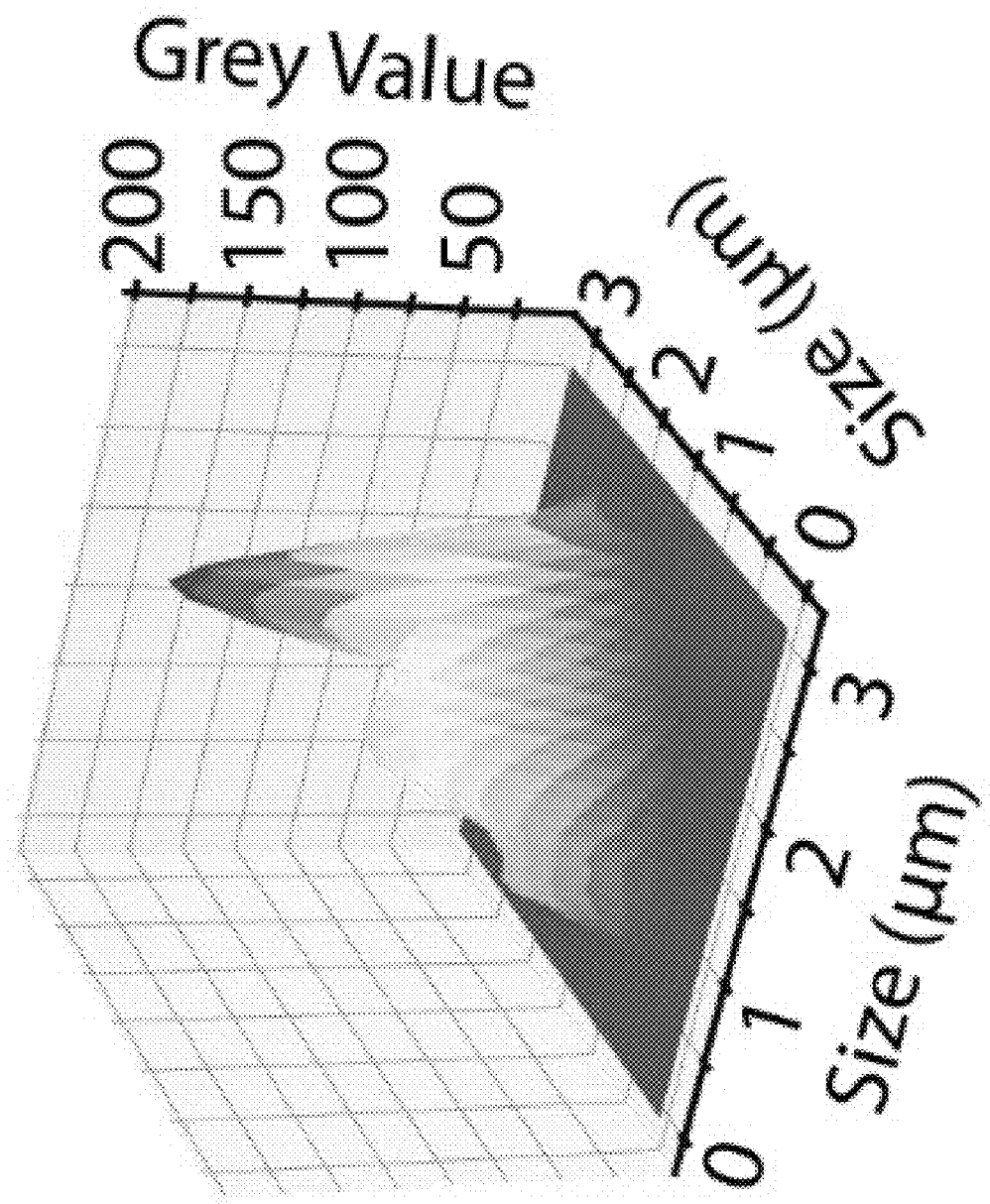
FIG. 16B illustrates gray values at various sizes of NPLs in accordance with embodiments.

Some embodiments provide that the intensity of the PL can be related to the number of NPLs within a stack. In certain embodiments, the intensity of the PL follows a near integer increase as the number of NPLs in a stack increase from 1 to 3. Grey value at various sizes of NPLs in accordance with an embodiment of the invention is illustrated in FIG. 16B. FIG. 16B shows a near integer increase in the grey value that correlates to 1, 2, and 3 NPLs.

Mechanistic Study of Mid-Gap State Formation

Many embodiments provide mechanisms for a large Stokes-shifted emission. Some embodiments may discount the possibility of retaining any Cd in the 3 ML structure by energy dispersive x-ray (EDX) measurements that show complete exchange as well as a loss of CdTe features in the absorption spectrum indicating no formation of type II CdTe/HgTe heterostructures or $Cd_xHg_{1-x}Te$ NPL alloys. Elemental Dispersive X-Ray Spectroscopy (EDX) of CdTe NPLs and HgTe NPLs in accordance with an embodiment is illustrated in FIG. 17A and FIG. 17B respectively. The (*) in FIGS. 17A and 17B denotes substrate and impurities. In several embodiments, a lack of change in the NPL absorption spectrum may suggest that neither aggregation nor relaxation of quantum confinement through growth of thicker NPLs plays a role in the emission. Several embodiments do not show any intra-band transitions in the absorption spectrum which could be indicative of electronic doping due to the surface chemistry. Several embodiments provide that a mid-gap state can be induced by conditions used during exchange, especially as mid-gap emission from the CdTe NPLs prior to the addition of Hg in OLA is not observed. Some embodiments show that immediately after synthesis, no absorption features beyond the band-edge of the NPL can be observed. Several embodiments provide that in aged samples (for example aged about 5 months), features that resemble HgTe QDs can be observed. Many embodiments provide that the SWIR emission may arise from room temperature colloidal growth of HgX nanoparticles following the cation exchange. The mid-gap emission can be assigned to the QDs as the spectral changes follow the mechanisms of colloidal growth and energy transfer. Several embodiments provide structural understanding may arise from changes in the NPL. Many embodiments provide the formation of sub-band emission to be general in HgX NPLs with varying composition and thickness. A number of embodiments use 3 ML HgTe NPLs to explore the parameters which give rise to the observed emission.

Figure 18A:
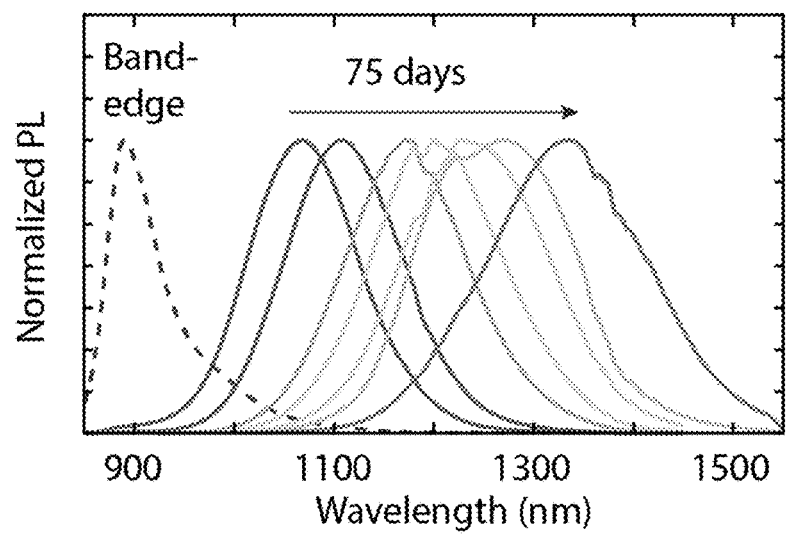
FIG. 18A illustrates the evolution of mid-gap emission over time for Cd:Hg:OLA (oleylamine) used during exchange in accordance with embodiments.
Figure 18B:
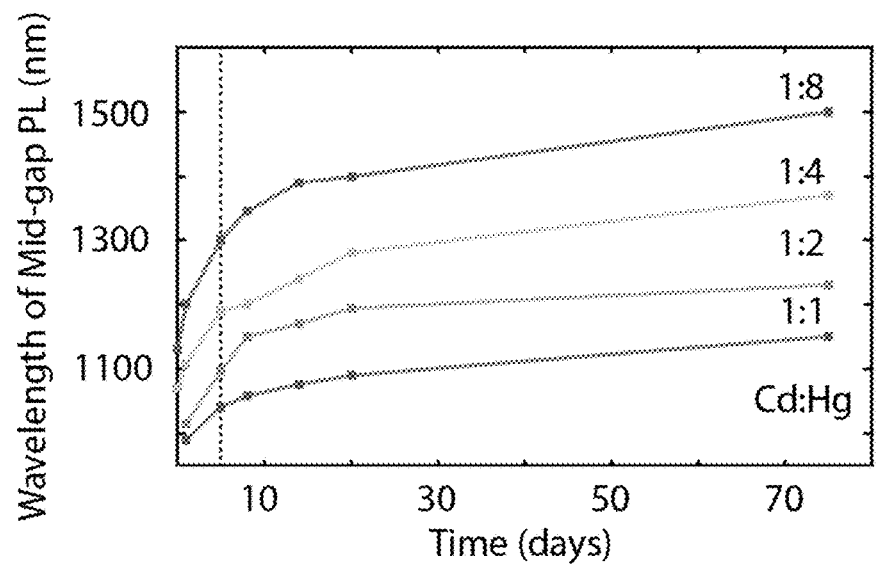
FIG. 18B illustrates the depth of the mid-gap state can be varied by changing the ratio of Cd:Hg used during exchange in accordance with embodiments.
Figure 18C:
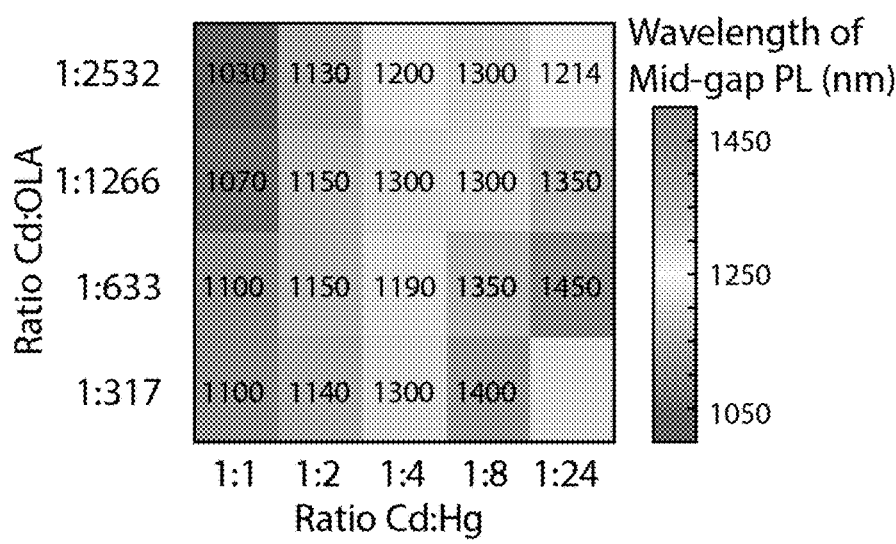
FIG. 18C illustrates synthetic conditions to induce mid-gap emission by changing the concentration of $Hg^{2+}$ in oleylamine (OLA) relative to cadmium in accordance with embodiments.

Several embodiments provide the exchange parameters on the evolution of the mid-gap state. The amount of Hg added in excess to the amount of Cd in the CdTe NPL (ratio Cd:Hg) can be varied in accordance with embodiments. Some embodiments vary the amount of oleylamine added in conjunction with $Hg^{2+}$ during exchange. Certain embodiments vary the length of time the colloidal system is left in a solution of hexanes after exchange. PL changes for a number of synthetic variables in accordance with an embodiment is illustrated in FIG. 18A-18C. FIG. 18A plots the band-edge emission obtained directly after cation exchange and the evolution of the mid-gap emission, monitored over 75 days. The mid-gap emission red-shifts rapidly in the days immediately after exchange and slows over longer time scales towards a maximum which appears to be intrinsic to the amount of excess Hg added (FIG. 18B). In some embodiments, further red-shifted emission with greater excesses of Hg can be obtained, but having excess is not strictly necessary to induce formation. In several embodiments, evolution can occur when using a 1:1 ratio (Cd:Hg). FIG. 18C shows the influence of oleylamine by changing the concentration of dissolved Hg and monitoring the PL after exchange (shown after five days). In many embodiments, greater excess of Hg may produce a larger red shift while greater excess of oleylamine may suppress the rate of this shift. Therefore, the final position of the mid-gap emission wavelength can be tunable through control of precursors in accordance with many embodiments.

Figure 19:
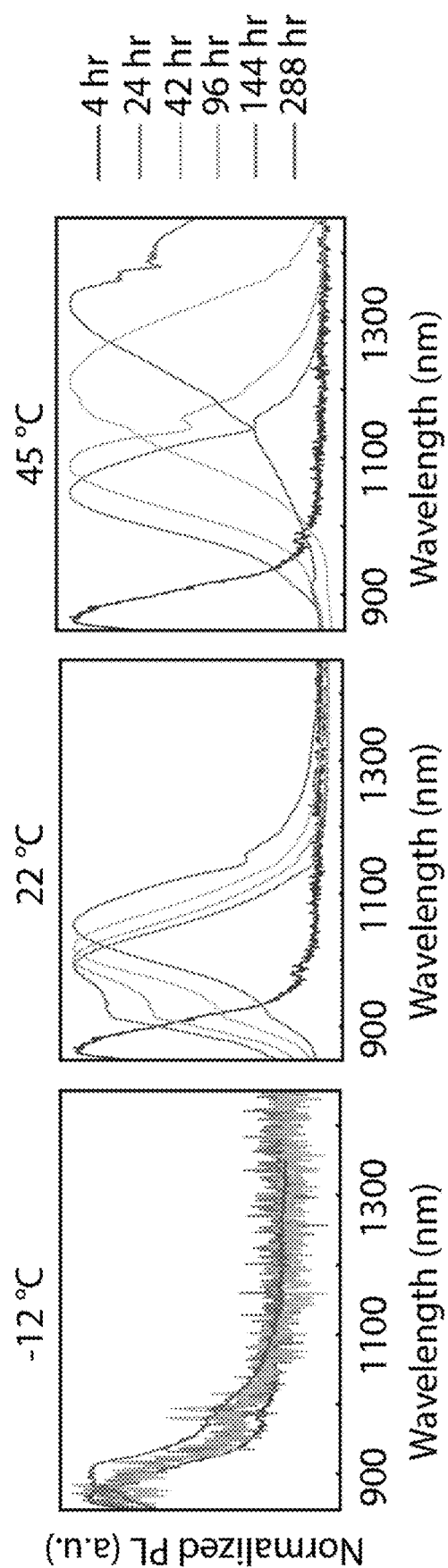
FIG. 19 illustrates the temperature dependence on the rate of mid-gap state evolution in accordance with embodiments.

In some embodiments, temperature can influence the mid-gap state evolution. the temperature dependence on the rate of mid-gap state evolution in accordance with an embodiment is illustrated in FIG. 19. Solutions are held at constant temperature after exchange and monitored by PL over the course of a week (or 12 days in the case of the cold sample).

Some embodiments provide that the formation of an emissive sub-band state may need both cation and ligand exchange. During the cation exchange reaction, the NPLs can experience a change in coating from oleic acid/oleate ligand to oleylamine. In many embodiments, the formation of mid-gap emission can be accompanied by an exchange from X-type ligands ($Hg(O_2R)_2$) to L-type ligands such as oleylamine (by the Green nomenclature). X-type ligands are one electron donors which can form a covalent bond with the metal. L-type ligands are two electron donors (often a lone pair) which can form a dative bond with the metal. This type of ligand exchange from X to L can happen in CdSe NCs capped with oleic acid, where a displacement is observed when an L-type ligand is introduced to a carboxylate bound to a metal site. Because the metal-carboxylate ($M(O_2R)_2$) can act as a ligand itself, exchange with the L-type ligand may remove a surface metal atom with two carboxylates as one unit. Similarly, in HgTe QDs this type of ligand displacement can introduce intragap emission which has been attributed to surface localized states. Many embodiments provide that HgTe NPLs capped with oleic acid/oleate may undergo this type of exchange with oleylamine, removing some of the surface Hg atoms from the newly formed NPLs. This could then introduce surface sites or defects from under-coordinated Te or dangling bonds which are reactive towards growth of QDs in accordance with several embodiments.

Figure 20A:
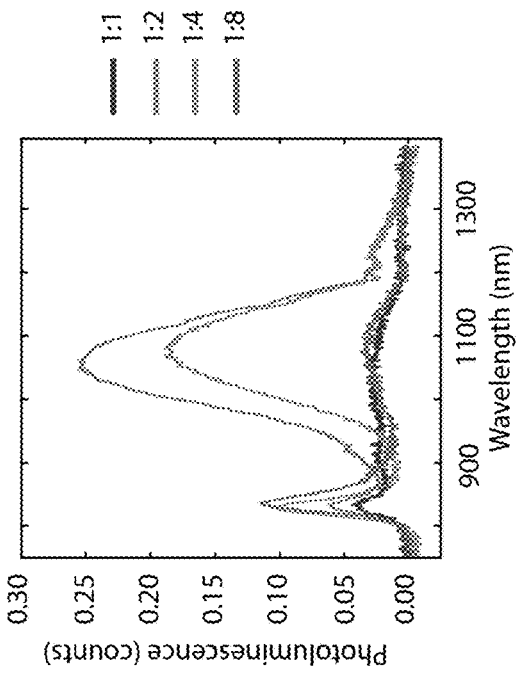
FIGS. 20A-20C illustrate photoluminescence of HgTe NPLs obtained through exchange in triisobutylamine in accordance with embodiments.
Figure 20B:
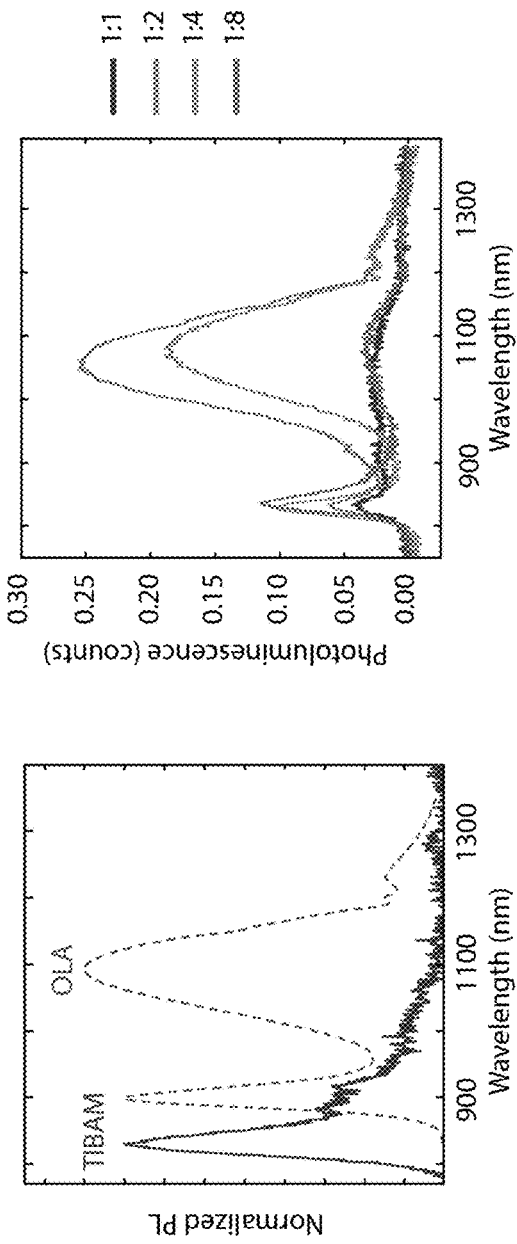
Figure 20C:
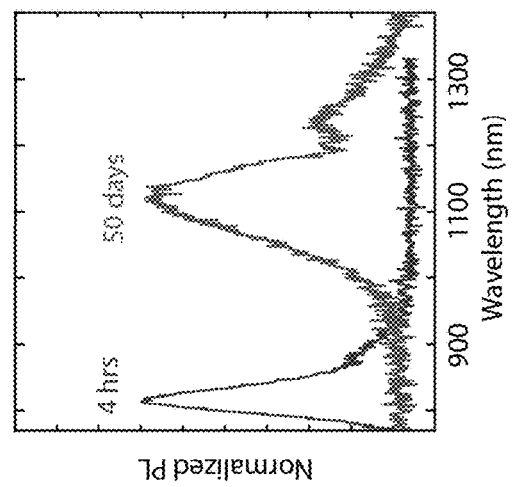

Many embodiments provide that the absorption spectrum of the NPLs can be sensitive to ligand type. Several embodiments show a red-shift characteristic of an OA to OLA exchange. In the case of exchange with a sterically-hindered amine, such as triisobutylamine, several embodiments provide that the NPLs may not experience this same behavior. In some embodiments, NPLs may retain the oleic acid/oleate and acetate ligands. In certain embodiments, mid-gap emission can be observed and the evolution can be arrested. Photoluminescence of HgTe NPLs obtained through exchange in triisobutylamine in accordance with an embodiment is illustrated in FIGS. 20A-20C. FIG. 20A illustrates PL of triisobutlyamine (TIBAM) exchanged NPLs compared to OLA exchanged NPLs. FIG. 20B illustrates PL of NPLs using varying ratios of $Hg^{2+}$ dissolved in triisobutylamine. FIG. 20C illustrates PL of a freshly synthesized sample showing only band edge emission, and a sample aged for 50 days. In some embodiments, the absorption and emission spectra do not show the slight red-shift as seen in the OA to OLA exchange. Ligand exchange may not be occurring in the same manner, and mid-gap state evolution may be hindered. In many embodiments, the interaction of oleylamine with the surface can be important for the evolution of QDs on the surface.

Many embodiments provide the emergence and evolution of the mid-gap emissive state through absorption, emission, and EDX spectroscopies. In several embodiments, the overall exchange can be a multi-step process which can be qualitatively divide by changes in the absorption and photoluminescence spectra, beginning with cation exchange from CdTe to HgTe. The absorption spectra for CdTe and HgTe NPL and their light hole (lh) and heavy hole (hh) features in accordance with an embodiment is illustrated in FIG. 21A. The ratio of HgTe hh/lh and wavelength of hh monitored by changes in the absorption spectrum during different timepoints of exchange in accordance with an embodiment is illustrated in FIG. 21B. The dashed line indicates formation of mid-gap emission. EDX monitoring stoichiometry changes during exchange in accordance with an embodiment is illustrated in FIG. 21C. A mechanism for observed stoichiometry changes where Hg atoms are removed from the NPL surfaces in accordance with an embodiment is illustrated in FIG. 21D.

Many embodiments provide that the rapid initial stage (I) can occur with the exchange of Cd with Hg. Removal of the Cd atoms happens within the first 10-15 minutes, as the CdTe heavy hole (hh)/light hole (lh) disappear and give rise to the HgTe hh/lh in the absorption spectrum (FIG. 21A). These HgTe features then begin to red-shift and grow in intensity during the second stage (II). During this first hour, the formation of HgTe NPLs can be monitored by the intensity of the hh/lh where the ratio is to exceed one, indicating a complete exchange. Some embodiments provide that by hour one, this ratio reaches 1.1 and EDX confirms the completed exchange of Cd to Hg (FIG. 21C, 60 min). In some embodiments, the stoichiometry of the NPLs is 40:60 (Hg:Te) which suggests that Te is in excess and supports the loss of Hg atoms occurring simultaneously to a changing ligand environment. The 40:60 (Hg:Te) ratio in several embodiments provides that surface Hg atoms can be stripped as Hg-oleate ligands are displaced by oleylamine, leaving two Hg layers and three Te layers in the NPL and changing the charge at the surface. Some embodiments provide that severe depletion of Hg in the system (perhaps from internal Hg layers) may happen while maintaining 3 ML thickness.

A number of embodiments show that from 1 hour to 4 hours (III), the hh/lh ratio may stabilize around 1.1 while the wavelength of absorption gradually red-shifts toward about 860 nm to about 880 nm. During this stage, the ratio of Hg:Te does not significantly change and Te remains in excess. Despite significant changes in stoichiometry during the total reaction (I-III), the loss of surface Hg atoms precedes mid-gap state emission and NPLs show only band edge emission (around about 900 nm) by this timepoint.

In the hours following exchange (IV), there is a decrease in the ratio of hh/lh suggesting some change in the electronic structure—potentially arising from the physical changes on the surface of the NPLs in accordance with several embodiments. After washing the NPLs at about 3.5 hr, the hh/lh ratio stabilizes again around 1. Many embodiments mark the final stage (V) as the formation and evolution of mid-gap emission which occurs between 4 hours and 24 hours after exchange. The band edge absorption and emission remain around 880 and 900 nm respectively as the mid-gap emission begins to red shift into the SWIR.

Figure 22A:
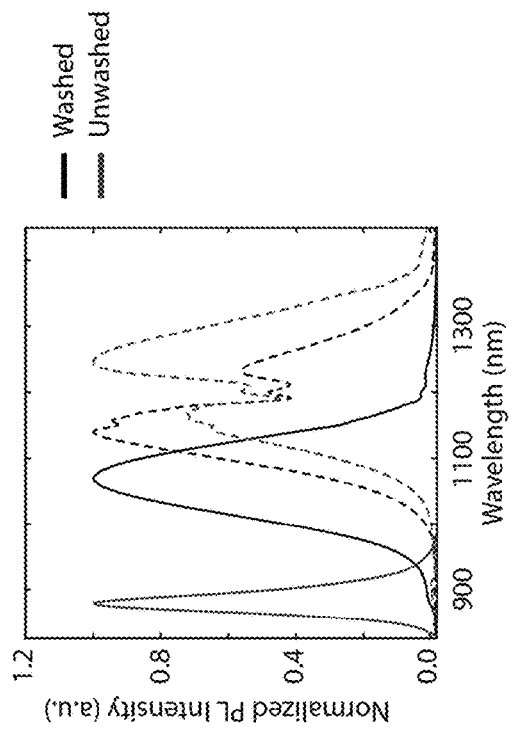
FIGS. 22A-22D illustrate the effect of washing on the absorption and emission spectra over time, and time dynamics of changes in the absorption spectra are further explored by changes in the hh/lh ratio and changes in the shift of wavelength in accordance with embodiments.
Figure 22C:
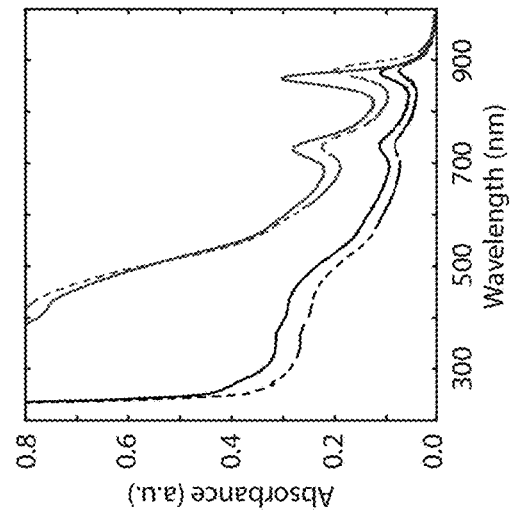
Figure 22B:
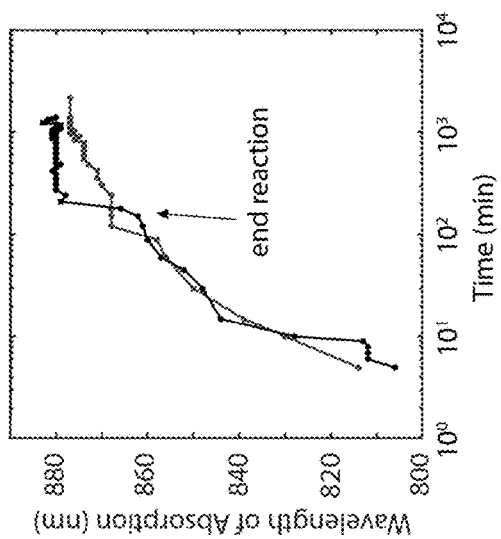
Figure 22D:
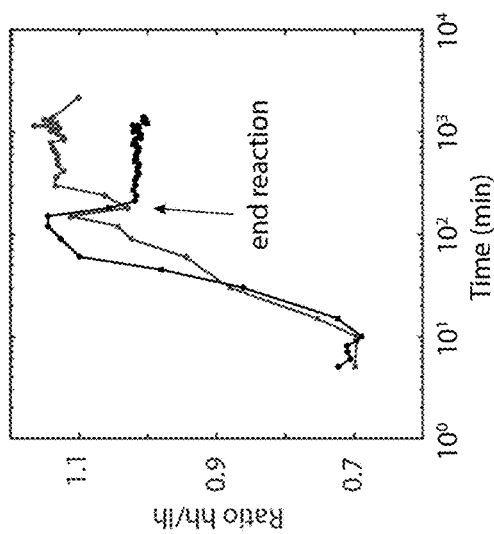

Some embodiments provide that the behavior may be similar for different samples and conditions. The effect of washing on the absorption and emission spectra over time in accordance with an embodiment of the invention is illustrated in FIG. 22A and FIG. 22B respectively. Solid lines are samples measured immediately after synthesis and dotted lines are measured after 5 days. Time dynamics of changes in the absorption spectra shown in changes in the hh/lh ratio and changes in the shift of wavelength in accordance with an embodiment is illustrated in FIG. 22C and FIG. 22D respectively. Samples are washed at 3.5 hr, indicated by the end of the reaction.

Figure 23A:
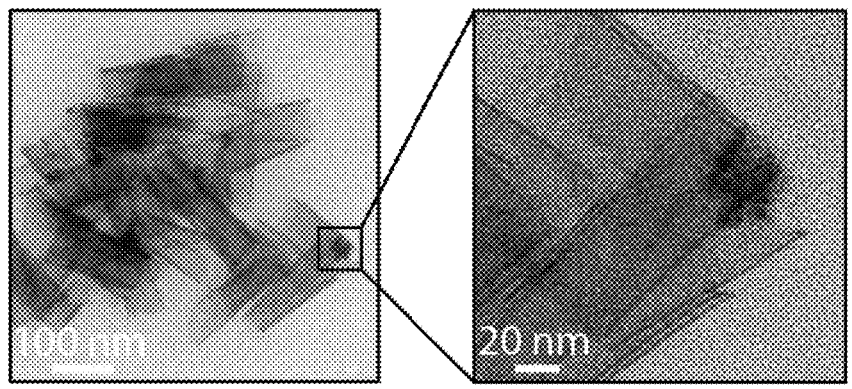
FIG. 23A illustrates transmission electron microscopy of HgTe nanoplatelets showing quantum dot growths after aging in accordance with embodiments.
Figure 23B:
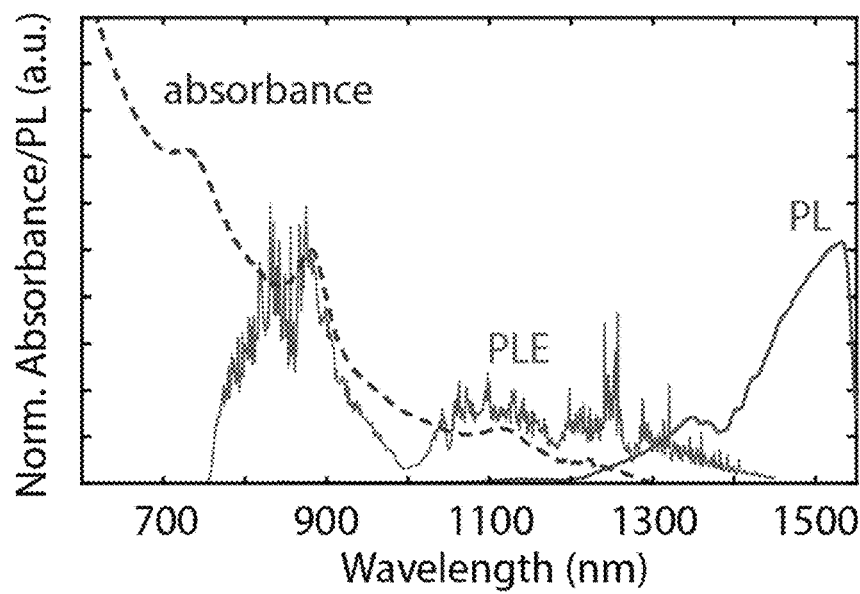
FIG. 23B illustrates absorbance, photoluminescence, and PLE for a HgTe sample aged 5 months in accordance with embodiments.
Figure 23C:
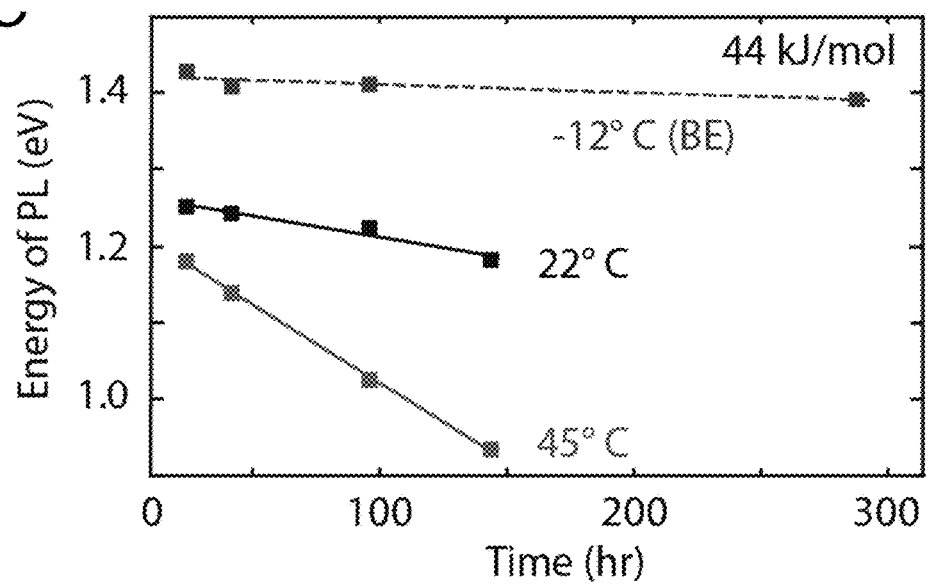
FIG. 23C illustrates the energy of mid-gap photoluminescence from solutions at elevated temperatures after exchange in accordance with embodiments.
Figure 24:
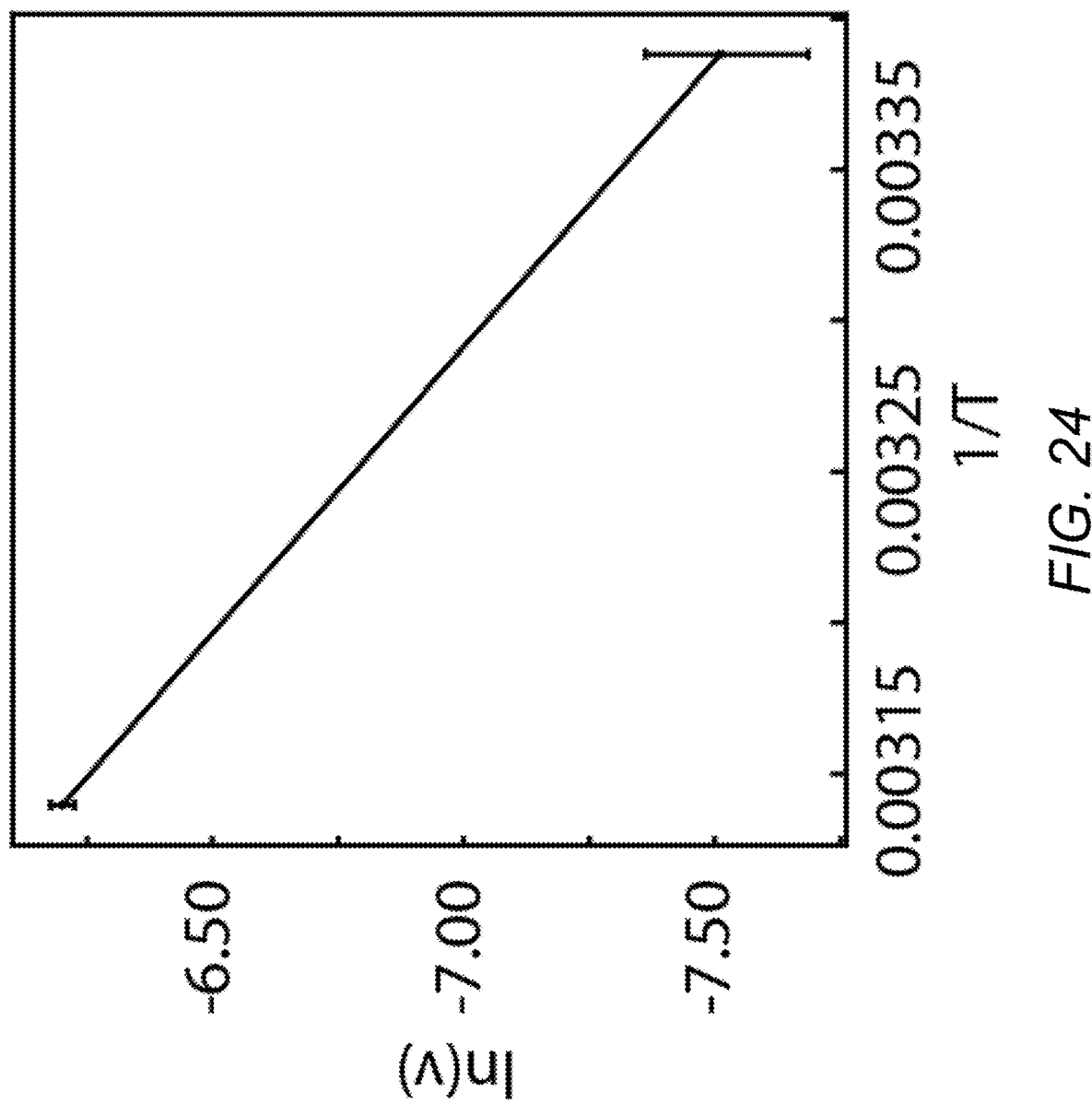
FIG. 24 illustrates the Arrhenius behavior of the NPLs during the immediate days post exchange, where the slope of the line gives an approximate activation energy for the early evolution of the mid-gap state in accordance with embodiments.

In many embodiments, transmission electron microscopy (TEM) of NPLs after exchange shows the presence of quantum dot-like moieties growing on or attached to NPLs in aged samples that show mid-gap emission. TEM of 3 ML HgTe NPLs showing quantum dot growths after aging in accordance with an embodiment is illustrated in FIG. 23A. Absorbance (dashed line), PL (solid line), and PLE (solid line) for a sample aged 5 months in accordance with an embodiment is illustrated in FIG. 23B. Certain embodiments monitor the evolution of the emission energy for the mid-gap state at three temperatures. The energy of mid-gap PL from solutions held at elevated temperatures (solid lines) after exchange in accordance with an embodiment is illustrated in FIG. 23C. When kept cold (dashed line), no shift from band-edge emission is observed (FIG. 23C). These QDs can survive washing steps by centrifugation and syringe filtering suggesting that they are either growing from the NPLs (possibly epitaxially) or attach to the NPLs after nucleation. Given the influence of excess precursor in solution, some embodiments provide that depletion of surface Hg atoms on the NPLs following ligand exchange with oleylamine may be giving rise to room temperature colloidal growth of HgX nanoparticles which act as quantum-confined defects. The removal of surface atoms may be inducing a surface rearrangement or simply providing reactive sites for growth of these nanoparticles without affecting the confinement of the NPLs, as seen in the absorption spectrum of aged samples showing only SWIR emission. Several embodiments show temperature dependence on the rate of evolution which also suggests a growth mechanism. A significant rate of PL shift increase at elevated temperatures, which can be fitted to an activation barrier of about 44 kJ/mole. These temperature kinetics are comparable to the bond energy in bulk HgTe (about 78 kJ/mol) and may be consistent with bond-forming or bond-breaking processes. The Arrhenius behavior of the NPLs in accordance with an embodiment is illustrated in FIG. 24. The Arrhenius behavior of the NPLs during the immediate days post exchange, where the slope of the line gives an approximate activation energy for the early evolution of the mid-gap state.

Many embodiments provide that the QDs can be in direct contact with the NPLs due to the quenching of the NPL band-edge emission, suggesting an energy transfer from platelet to dot which is much faster than radiative recombination in the NPL. Several embodiments provide that the system can be experiencing a near field energy transfer rather than a FRET process where the QY might be limited to 10% by the donor (NPL band-edge). Some embodiments provide that the QY can be consistently higher than about 10%, showing that the QD is either very close to or growing from the NPL surface.

Similar large Stokes-shifted emission due to defects can be seen in other colloidal NCs such as metal dopants in $CuInSe_2$ or CdSe/ZnS and non-coordinated surface selenium in ultra-small CdSe, but tunability of these defect states may be dependent on defect dopant concentration, and these systems may not display SWIR emission. Dot-on-nanoplatelet heterostructures can be observed for CdSe/ZnSe and more recently PbSe/CdSe, but these systems may not show the same continual room-temperature growth dynamics. Many embodiments can produce a new type of heterostructure SWIR emitter with large Stokes-shifts that is tunable through the SWIR. Several embodiments provide that these emissive states may arise from energy transfer to defect-like SWIR emitting nanoparticles attached to the NPLs which evolve over time. It can be through structural rearrangement or colloidal growth.

Quantum Yield and Lifetime Comparison

Many embodiments are able to obtain time-resolved photoluminescence of SWIR emitting NPLs at varying stages of mid-gap emission evolution. Some embodiments use superconducting nanowire single photon detectors and a time-tagged photon counting module. Photoluminescence lifetimes from HgTe NPLs in accordance with an embodiment is illustrated in FIG. 25A. FIG. 25A shows only band-edge (around 880 nm) and two samples with varying mid-gap emission (around 1280 nm and around 1500+ nm). The corresponding PL spectra of HgTe NPLs in FIG. 25A in accordance with an embodiment is illustrated in FIG. 25B. In FIG. 25B, the (*) indicates the limits of the detector. The QY of organic dye and QD fluorophores across the NIR/SWIR in accordance with an embodiment is illustrated in FIG. 25C. Lifetimes collected from NPLs showing only band-edge have an average lifetime of about 7.4 ns while those which show mid-gap emission from the QDs have an average lifetime of about 130 ns. The fit parameters and average lifetimes for HgTe NPLs showing only band edge (BE) emission, mixed band edge and mid-gap emission, and only mid-gap emission in accordance with an embodiment is illustrated in FIG. 26. Taking the QY of SWIR emitting QD-on-NPLs to be (0.3) this lifetime suggests a radiative rate of approximately 430 ns in accordance with some embodiments.

Figure 27B:
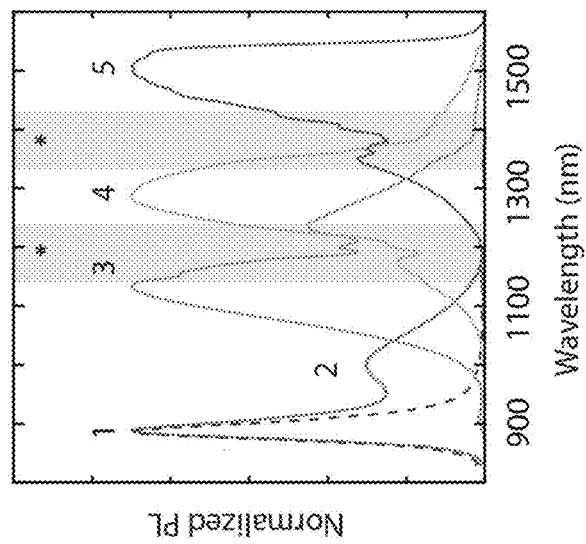
FIGS. 27A-27B illustrate the PL lifetimes and their fits of HgTe NPLs showing band edge emission (1), intermediate mid-gap emission (2-4), and deep mid-gap (5, 1500 nm+) emission, and the respective PL spectra in accordance with embodiments.
Figure 27A:
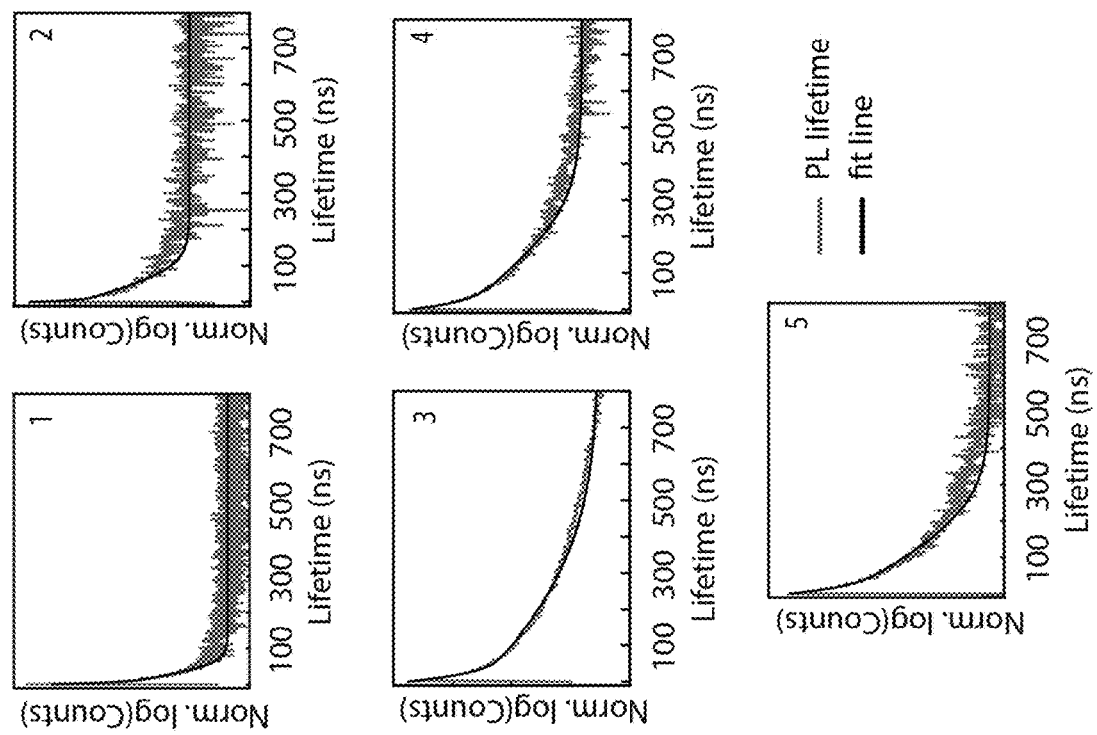

In several embodiments, various mid-gap emitting NPLs (regardless of their central wavelength) show similar dynamics, suggesting a common nature to the mid-gap emission, regardless of depth. The PL lifetimes and their fits of HgTe NPLs showing only band edge emission (1), intermediate mid-gap emission (2-4), and deep mid-gap (5, 1500 nm+) emission in accordance with an embodiment is illustrated in FIG. 27A. The respective PL spectra in accordance with an embodiment is illustrated in FIG. 27B. The (*) indicates solvent reabsorption and the detector cutoff is 1550 nm. The carrier lifetimes for these SWIR emitting HgTe NPLs can be faster than PbS QDs, which may have lifetimes on the order of microseconds, and slightly faster than HgTe QDs which may be about 480 ns. While maintaining fast radiative rates, HgTe NPLs/QD heterostructures show high QY that can be competitive with other quantum dots which emit in this region of the spectrum in accordance with many embodiments.

DOCTRINE OF EQUIVALENTS

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A tunable light emitter comprising:
    a nanoplatelet heterostructure, wherein the nanoplatelet heterostructure comprises at least two monolayers of a II-VI semiconductor material; and
    at least one quantum dot on a first surface of the nanoplatelet heterostructure;
    wherein the at least one quantum dot tunes emission of the nanoplatelet heterostructure and the nanoplatelet heterostructure emits in wavelength range from 900 nm to 1500 nm.

2. The tunable light emitter of claim 1, wherein the nanoplatelet heterostructure is a two-dimensional structure with quantum confinement along its integer atomic thickness.

3. The tunable light emitter of claim 1, wherein the II-VI semiconductor material is mercury chalcogenide or cadmium chalcogenide, wherein chalcogenide is selected from the group consisting of sulfide, selenide, and telluride.

4. The tunable light emitter of claim 1, wherein the nanoplatelet heterostructure comprises at least two monolayers of mercury selenide, three monolayers of mercury selenide, two monolayers of mercury telluride, three monolayers of mercury telluride, two monolayers of cadmium selenide, three monolayers of cadmium selenide, four monolayers of cadmium selenide, five monolayers of cadmium selenide, two monolayers of cadmium telluride, or three monolayers of cadmium telluride.

5. The tunable light emitter of claim 1, wherein the light emitter has a quantum yield of greater than 30%.

6. The tunable light emitter of claim 1, wherein the nanoplatelet heterostructure has a lateral dimension of at least 100 nanometers.

7. The tunable light emitter of claim 6, wherein the nanoplatelet heterostructure has a lateral dimension of at least 1 micron.

8. The tunable light emitter of claim 1, wherein the nanoplatelet heterostructure has a surface area from $6 \times 10^5$ nm$^2$ to $1 \times 10^6$ nm$^2$.

9. The tunable light emitter of claim 1, wherein the at least one quantum dot is grown on the first surface of the nanoplatelet heterostructure in-situ or ex-situ.

10. The tunable light emitter of claim 1, wherein the at least one quantum dot comprises a II-VI semiconductor material.

11. The tunable light emitter of claim 10, wherein the II-VI semiconductor material is mercury chalcogenide or cadmium chalcogenide, wherein chalcogenide is selected from the group consisting of sulfides, selenides, and tellurides.

12. A method of synthesizing a nanoplatelet heterostructure, comprising:
    providing at least one II-VI semiconductor seed, wherein the seed comprises at least one nanoplatelet;
    suspending the at least one II-VI semiconductor seed in a solution;
    adding at least one metal precursor in the solution;
    adding at least one chalcogen precursor to the solution at an injection rate;
    heating the solution to at least 180° C.;
    cooling the heated solution; and
    precipitating the nanoplatelet heterostructure;
    wherein the nanoplatelet heterostructure has a lateral dimension of at least 1 micron; and
    wherein the chalcogen precursor is tri-n-octylphosphine sulfide or tri-n-octylphosphine telluride.

13. The method of claim 12, wherein the injection rate is less than 1 mL/hour.

14. The method of claim 13, wherein the injection rate is less than 0.55 mL/hour.

15. The method of claim 12, wherein the solution is heated to a temperature between 220° C. to 240° C.

16. The method of claim 12, wherein the metal precursor is cadmium precursor or mercury precursor.

17. The method of claim 12, wherein the at least one II-VI semiconductor seed is mercury chalcogenide or cadmium chalcogenide, wherein chalcogenide is selected from the group consisting of sulfides, selenides, and tellurides.

* * * * *